United States Patent
Yoshida et al.

(10) Patent No.: US 9,867,380 B2
(45) Date of Patent: Jan. 16, 2018

(54) APPARATUS FOR CUTTING OUT NOODLE

(75) Inventors: Kunihiko Yoshida, Osaka (JP); Yoshifumi Miyazaki, Osaka (JP); Tatsuo Yamaya, Osaka (JP); Mitsuru Tanaka, Osaka (JP)

(73) Assignee: Nissin Foods Holdings Co., Ltd., Osaka (JP)

( * ) Notice: Subject to any disclaimer, the term of this patent is extended or adjusted under 35 U.S.C. 154(b) by 693 days.

(21) Appl. No.: 13/058,089

(22) PCT Filed: Oct. 29, 2009

(86) PCT No.: PCT/JP2009/005731
§ 371 (c)(1),
(2), (4) Date: Feb. 8, 2011

(87) PCT Pub. No.: WO2010/146635
PCT Pub. Date: Dec. 23, 2010

(65) Prior Publication Data
US 2011/0138979 A1    Jun. 16, 2011

(30) Foreign Application Priority Data
Jun. 16, 2009   (JP) .................... 2009-143020

(51) Int. Cl.
| A21C 11/24 | (2006.01) |
| B26D 1/24 | (2006.01) |
| B26D 7/18 | (2006.01) |

(52) U.S. Cl.
CPC .............. *A21C 11/24* (2013.01); *B26D 1/245* (2013.01); *B26D 7/1818* (2013.01);
(Continued)

(58) Field of Classification Search
CPC ......... A21C 11/24; A21C 11/00; A21C 11/04; B26D 1/24; B26D 1/245; B26D 7/1818;
(Continued)

(56) References Cited

U.S. PATENT DOCUMENTS 4,534,251 A * 8/1985 Wilson ........................ 83/111
4,889,291 A * 12/1989 Goldhammer et al. ...... 241/167

FOREIGN PATENT DOCUMENTS

| JP | 57-203787 U | 12/1982 |
| JP | S59-70485 U | 5/1984 |

(Continued)

OTHER PUBLICATIONS

Extended European Search Report dated Apr. 4, 2014, in corresponding European Patent Application No. 09846128.

*Primary Examiner* — Clark F Dexter
(74) *Attorney, Agent, or Firm* — Muncy, Geissler, Olds & Lowe, P.C.

(57) ABSTRACT

An apparatus for cutting out noodle can prevent damage to scraping teeth of a scraper and prevent noodle threads from being caught at a fixing position of the scraper. The apparatus includes a housing, a first roller having a first receiving portion, a second roller having a second receiving portion, a first scraper secured at a first fixing position and having first scraping teeth inserted in the first receiving portion, a second scraper having second scraping teeth, a third scraper secured at a second secured position and having third scraping teeth, and a fourth scraper having fourth scraping teeth. The first and third scrapers include first and second transfer holes, respectively. The first fixing position is located more outwardly in a horizontally outward direction than a second tooth tip, and the third fixing position is located more outwardly in the horizontally outward direction than a fourth tooth tip.

5 Claims, 17 Drawing Sheets

(52) U.S. Cl.
CPC ............... *Y10S 83/932* (2013.01); *Y10T 83/21* (2015.04); *Y10T 83/212* (2015.04); *Y10T 83/783* (2015.04)

(58) Field of Classification Search
CPC .... Y10S 83/932; Y10T 83/2096; Y10T 83/21; Y10T 83/2111; Y10T 83/2113; Y10T 83/2116; Y10T 83/2118; Y10T 83/212; Y10T 83/217; Y10T 83/4702; Y10T 83/783
USPC .......... 83/500, 111, 113, 118–122, 145, 305, 83/932; 241/236, 167; 426/464, 473, 426/518
See application file for complete search history.

(56) References Cited

FOREIGN PATENT DOCUMENTS

| | | | |
|---|---|---|---|
| JP | 63-28379 | U | 2/1988 |
| JP | 63-45903 | Y2 | 11/1988 |
| JP | H6-178643 | A | 6/1994 |
| JP | 3012023 | U | 6/1995 |
| JP | 8-84554 | A | 4/1996 |
| JP | 10-210924 | A | 8/1998 |
| JP | 2002-127083 | * | 5/2002 |
| JP | 2006-255832 | * | 8/2006 |
| JP | 2010-142199 | A | 7/2010 |

* cited by examiner

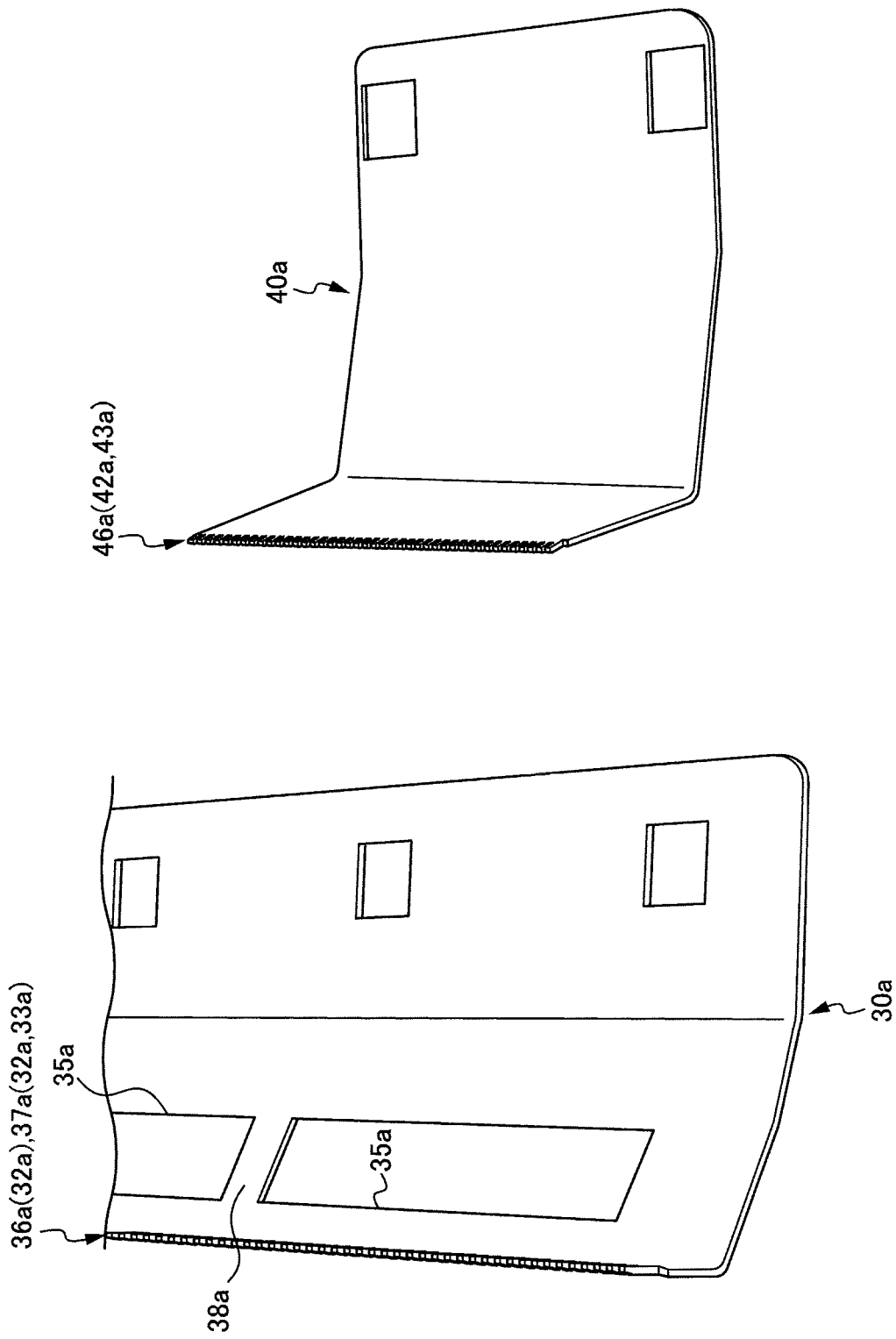

APPARATUS FOR CUTTING OUT NOODLE

TECHNICAL FIELD

The present invention relates to an apparatus for cutting out a noodle strip into noodle threads by a roller having cutting blades in manufacturing noodles.

BACKGROUND ART

Conventionally, as a method for cutting out noodle threads by a machine, a method has been prevailing, in which a thin noodle strip of a belt-like shape rolled from noodle dough travels between a pair of rollers having cutting blades that rotate oppositely to each other such that the thin noodle strip is cut out into a thread shape. Each of the pair of rollers having cutting blades includes a plurality of blades formed in a circumferential direction and a plurality of grooves formed between the blades. A roller having cutting blades includes a plurality of types of blades such as a square blade type, a round blade type, a kitchen knife type, and the like, depending on shapes of noodle threads to be cut out, shapes of teeth tips, and the like.

For example, the square blade type cuts out a noodle strip by allowing a convex pushing portion (also called a thread) that is formed at one roller to be inserted into a concave receiving portion (also called a groove) at the other roller. Furthermore, the round blade type and kitchen knife type cut out a noodle strip by allowing one tip portion (in a case of the round blade type, a portion having a thin groove (a shallow groove)) of the pushing portion that is formed at one roller to abut the other tip portion (in a case of the round blade type, a portion having a thick groove (a deep groove)) of the receiving portion that is formed at the other roller. In each case, the noodle threads thus cut out end up being pushed into a plurality of spaces that is formed by the rollers facing each other in mesh, i.e. on a groove side in the spaces formed by pushing portions and grooves (the receiving portions).

Since a noodle thread pushed into a groove is in contact with a lateral side of the groove, the noodle thread rotationally travels along with the rotation of the roller. The noodle thread in contact with the lateral side of the groove is scraped from the groove by a scraper having comb-like teeth. More specifically, tips of the plurality of teeth (scraping teeth) formed at the scraper are inserted into the grooves, so that the noodle threads that rotationally travel along with the rotation of the roller are scraped from the grooves. The noodle threads thus cut out are cut at a constant length in a subsequent process.

In addition, there is another problem in manufacturing noodles associated with noodles sticking to each other. It is not preferable if noodle threads stick to each other. Because they would not separate from each other to shape into a ball during cooking or eating, or the noodle threads, which are forcibly separated from each other, may be broken into short pieces.

Thus, a technique associated with preventing noodle threads from sticking to each other has been known. In this technique, the timing for scraping the noodle threads at one roller having cutting blades is adjusted by changing respective positions (with respect to circumferential positions of the roller) of adjacent teeth tips. Such a prior technique of shifting positions of adjacent teeth tips at a scraper to a backward or forward position in a circumferential direction of a roller having cutting blades is described in Japanese Unexamined Patent Application Publication No. 10-210924, Japanese Unexamined Patent Application Publication No. 8-84554, and Japanese Unexamined Utility Model Application Publication No. S57-203787.

Among these, Japanese Unexamined Patent Application Publication No. 10-210924 and Japanese Unexamined Patent Application Publication No. 8-84554 disclose techniques whereby positions of teeth tips of adjacent comb-like teeth are shifted by differing lengths between adjacent scraping teeth at a scraper.

On the other hand, Japanese Unexamined Utility Model Application Publication No. S57-203787 discloses a technique in which the positions of teeth tips of adjacent comb-like teeth are dislocated by using two scrapers for a single roller having cutting blades and by shifting the respective positions of the scrapers to a backward or forward position in a circumferential direction.

DISCLOSURE OF THE INVENTION

Problems to be Solved by the Invention

However, although the techniques disclosed in Japanese Unexamined Patent Application Publication No. 10-210924, Japanese Unexamined Patent Application Publication No. 8-84554, and Japanese Unexamined Utility Model Application Publication No. S57-203787 can to some extent prevent the noodle threads from sticking to each other, those documents have the problems. More specifically, in the techniques disclosed in Japanese Unexamined Patent Application Publication No. 10-210924 and Japanese Unexamined Patent Application Publication No. 8-84554, since the lengths of adjacent comb-like teeth (scraping teeth) at a scraper are made different, there is a particular problem in that longer scraping teeth may suffer from damage such as being broken or bent due to metal fatigue.

On the other hand, in the technique disclosed by Japanese Unexamined Utility Model Application Publication No. S57-203787, since two scrapers for a single roller having cutting blades are used and respective positions of the scrapers are shifted to backward or forward, it is not necessary to render the scraping teeth to be long in particular, as different from the techniques disclosed in Japanese Unexamined Patent Application Publication No. 10-210924 and Japanese Unexamined Patent Application Publication No. 8-84554. Accordingly, the problem of the abovementioned scraping teeth possibly being damaged can be prevented.

However, the technique disclosed in Japanese Unexamined Utility Model Application Publication No. S57-203787 has the following problem. More specifically, a scraper that is disposed close to a meshing position of rollers having cutting blades may bring about various failures. For example, it is likely that noodle threads scraped by a scraper to fall from a roller having cutting blades are caught at the scraper that is located close to a meshing position or at the fixing position thereof (where the scraper is secured to a housing), failing to fall on a belt conveyor for conveying the cut out noodle threads.

It is an object of the present invention to provide an apparatus for cutting out noodle that can prevent noodle threads from sticking to each other, scraping teeth of a scraper from suffering from damage, and the noodle threads from being caught at a secured position of the scraper.

Means for Solving the Problems

In an aspect of the present invention, an apparatus for cutting out noodle is provided, which comprises a housing, a first roller having cutting blades, a second roller having cutting blades, a first scraper, a second scraper, a third scraper, a fourth scraper. The first roller is rotatable in a first direction about a first rotation axis and includes a plurality of first pushing portions formed in a circumferential direction and a plurality of first receiving portions respectively formed between the plurality of pushing portions. The second roller is rotatable in a second direction opposite to the first direction about a second rotation axis parallel to the first rotation axis. The second roller includes a plurality of second pushing portions formed in a circumferential direction and a plurality of second receiving portions respectively formed between the plurality of second pushing portions. The second roller is disposed so as to mesh with the first roller at a meshing position. The first scraper includes a plurality of first scraping teeth inserted into the plurality of first receiving portions. The first scraper is fixed to the housing at a first fixing position. The second scraper includes a plurality of second scraping teeth respectively inserted into the remainder of the first receiving portions into which the first scraping teeth are not inserted. A second tooth end of each of the plurality of second scraping teeth is disposed more downstream from the meshing position in the first rotation direction about the first rotation axis than a first tooth end of each of the plurality of first scraping teeth. The second scraper is fixed to the housing at a second fixing position. The third scraper includes a plurality of third scraping teeth inserted into the plurality of second receiving portions, and is fixed to the housing at a third fixing position. The fourth scraper includes a plurality of fourth scraping teeth respectively inserted into the remainder of the second receiving portions into which the plurality of third scraping teeth is not inserted. A fourth tooth end of each of the plurality of fourth scraping teeth is disposed more downstream from the meshing position in the second rotation direction about the second rotation axis than a third tooth end of each of the plurality of third scraping teeth. The fourth scraper is fixed to the housing at a fourth fixing position. The first scraper includes a first transfer hole allowing noodle threads, which are scraped to fall from each of the plurality of first receiving portions by the plurality of second scraping teeth of the second scraper, to pass through below the first scraper. The third scraper includes a second transfer hole allowing noodle threads, which are scraped to fall from each of the plurality of second receiving portions by the plurality of fourth scraping teeth of the fourth scraper, to pass through below the third scraper. In a case where a position away from the meshing position in a horizontal direction that is orthogonal to the first rotation axis and the second rotation axis is referred to as being outward in a horizontally outward direction, the first fixing position lies more outward in the horizontally outward direction than a position of second teeth ends of the second scraping teeth, and the third fixing position lies more outward in the horizontally outward direction than a position of fourth teeth ends of the fourth scraping teeth.

It is preferable that the second scraper extends to the first roller having cutting blades from an opposite side with respect to the first scraper via the first transfer hole and the fourth scraper extends to the second roller having cutting blades from an opposite side with respect to the third scraper via the second transfer hole.

It is preferable that the second fixing position lies more outward in the horizontally outward direction than the first fixing position and the fourth fixing position lies more outward in the horizontally outward direction than the third fixing position.

It is preferable: The second scraper comprises a plurality of scrapers arranged along the first rotation axis. The first transfer hole comprises a plurality of holes provided along the first rotation axis so as to be adaptable to the plurality of scrapers, and the holes adjacent to each other along the first rotation axis are discontinuous. The fourth scraper comprises a plurality of scrapers arranged along the second rotation axis. The second transfer hole comprises a plurality of holes provided along the second rotation axis so as to be adaptable to the plurality of scrapers, and the holes adjacent to each other along the second rotation axis are discontinuous.

It is preferable that the second scraper lies closer to the first roller having cutting blades than the first scraper and the fourth scraper lies closer to the second roller having cutting blades than the third scraper.

Effects of the Invention

According to the present invention, the apparatus for cutting out noodle can be provided which can prevent the noodle threads from sticking to each other, the scraping teeth of the scrapers from suffering from damage, and the threads of noodle from being caught at the secured positions of the scrapers.

BRIEF DESCRIPTION OF THE DRAWINGS

FIG. 6 is a perspective view illustrating an arrangement of a first scraper 30a and a second scraper 40a;

FIG. 7 is a perspective view showing a state in which the first scraper 30a is separated from the second scraper 40a;

FIG. 8A is a view illustrating an arrangement of teeth at the first scraper 30a and the second scraper 40a;

FIG. 9A is a view illustrating an arrangement of a group of first teeth 36a at the first scraper 30a;

FIG. 9B is a view illustrating an arrangement of a group of second teeth 37a at the first scraper 30a;

FIG. 9C is a view illustrating an arrangement of teeth 46a at the second scraper 40a;

PREFERRED MODE FOR CARRYING OUT THE INVENTION

First Embodiment

Figure 1:
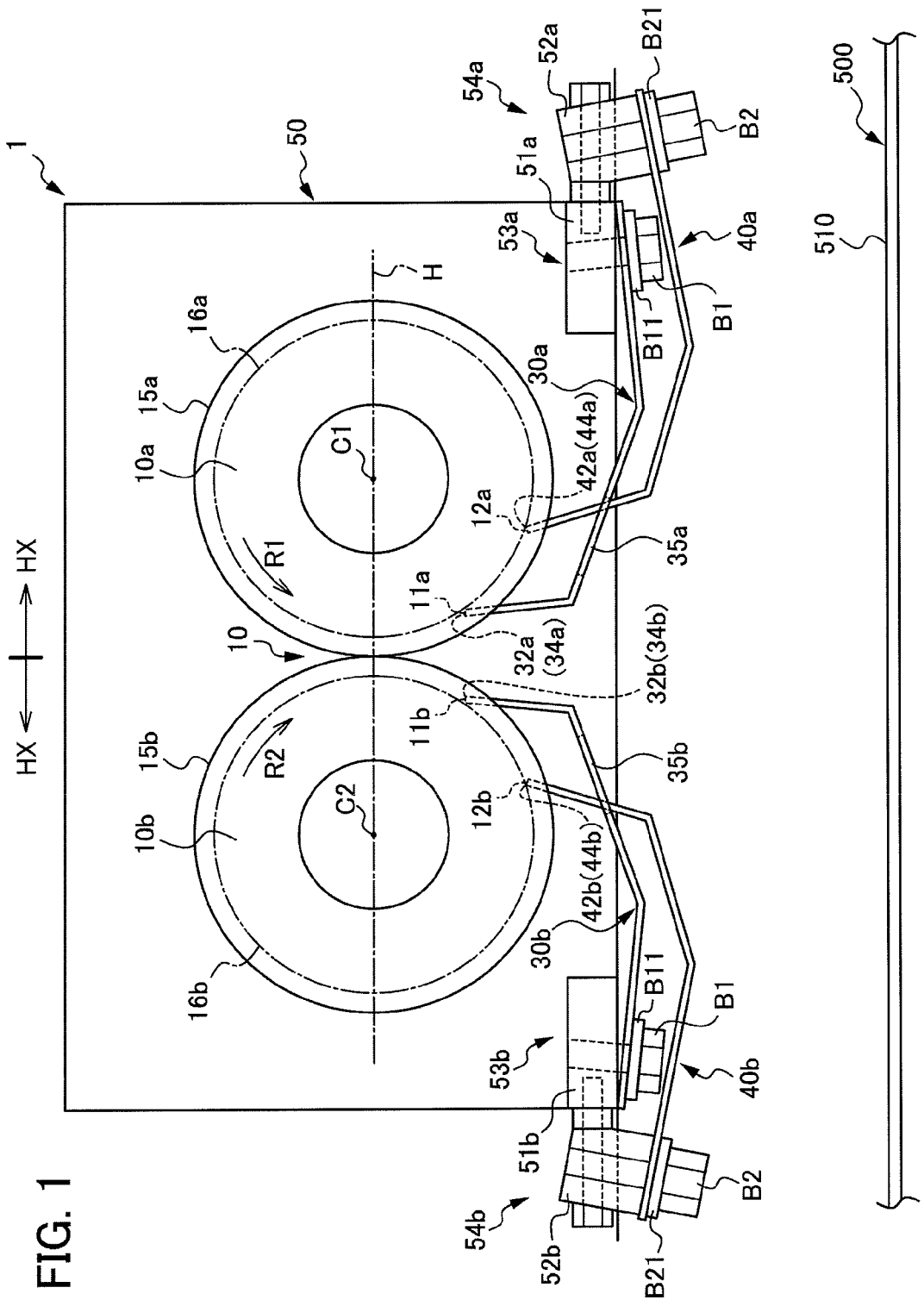
FIG. 1 is a cross-sectional view illustrating a structure of an apparatus 1 for cutting out noodle according to a first embodiment.
Figure 2:
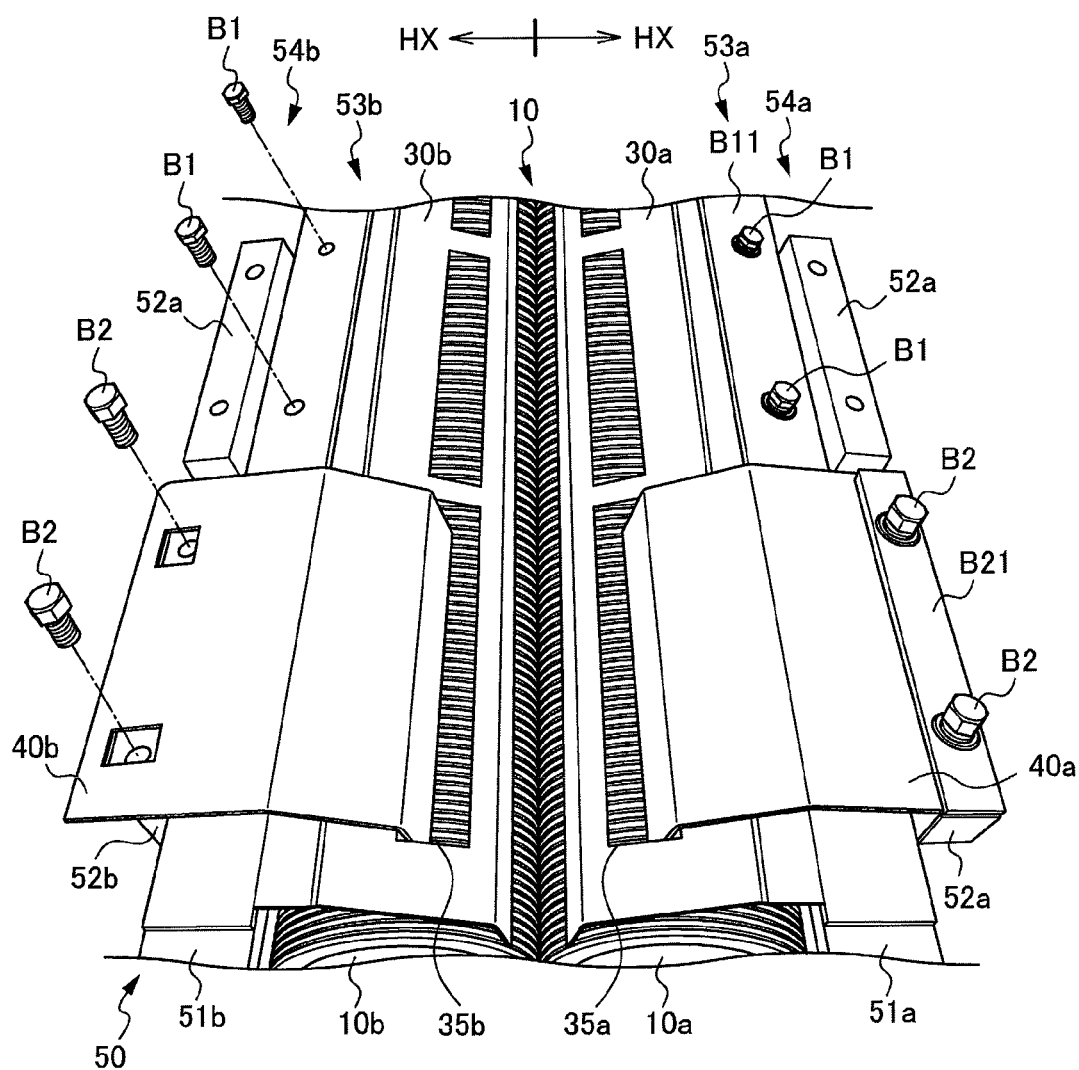
FIG. 2 is a perspective view of the apparatus 1 for cutting out noodle shown in FIG. 1, as seen from below.
Figure 3:
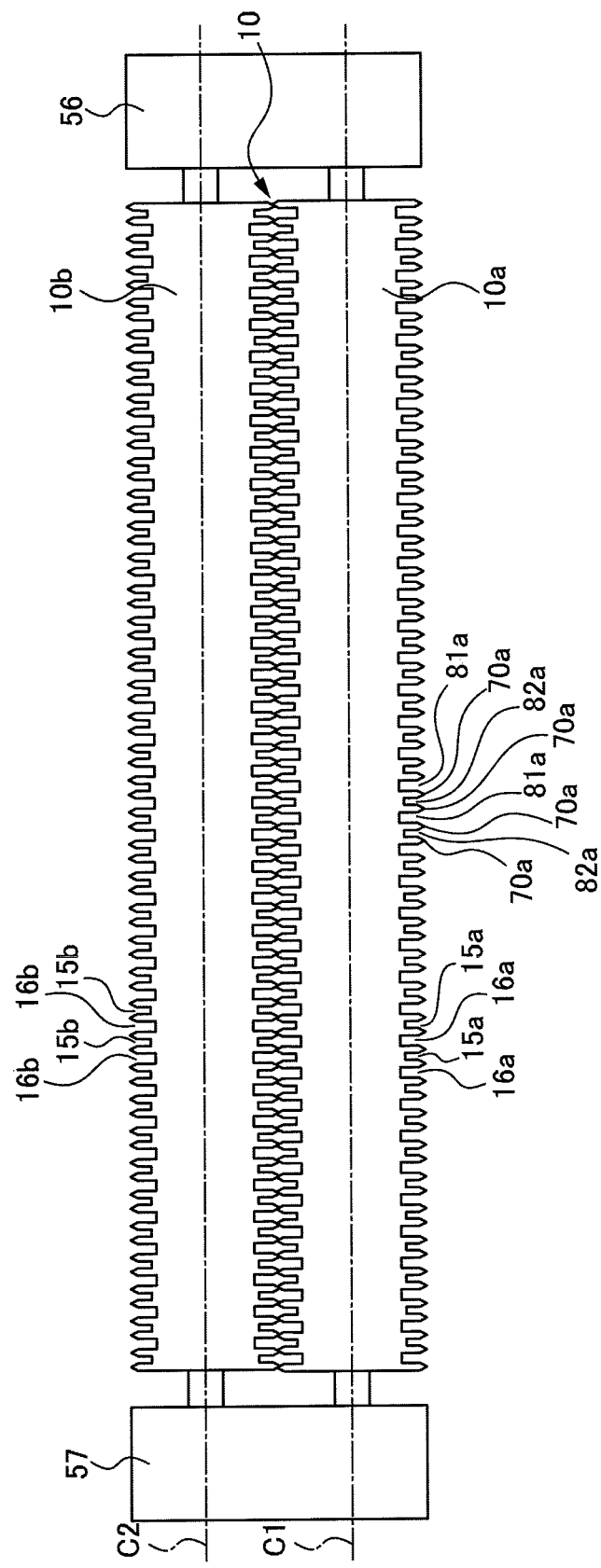
FIG. 3 is a plan view illustrating a first roller 10a having cutting blades and a second roller 10b having cutting blades.
Figure 4:
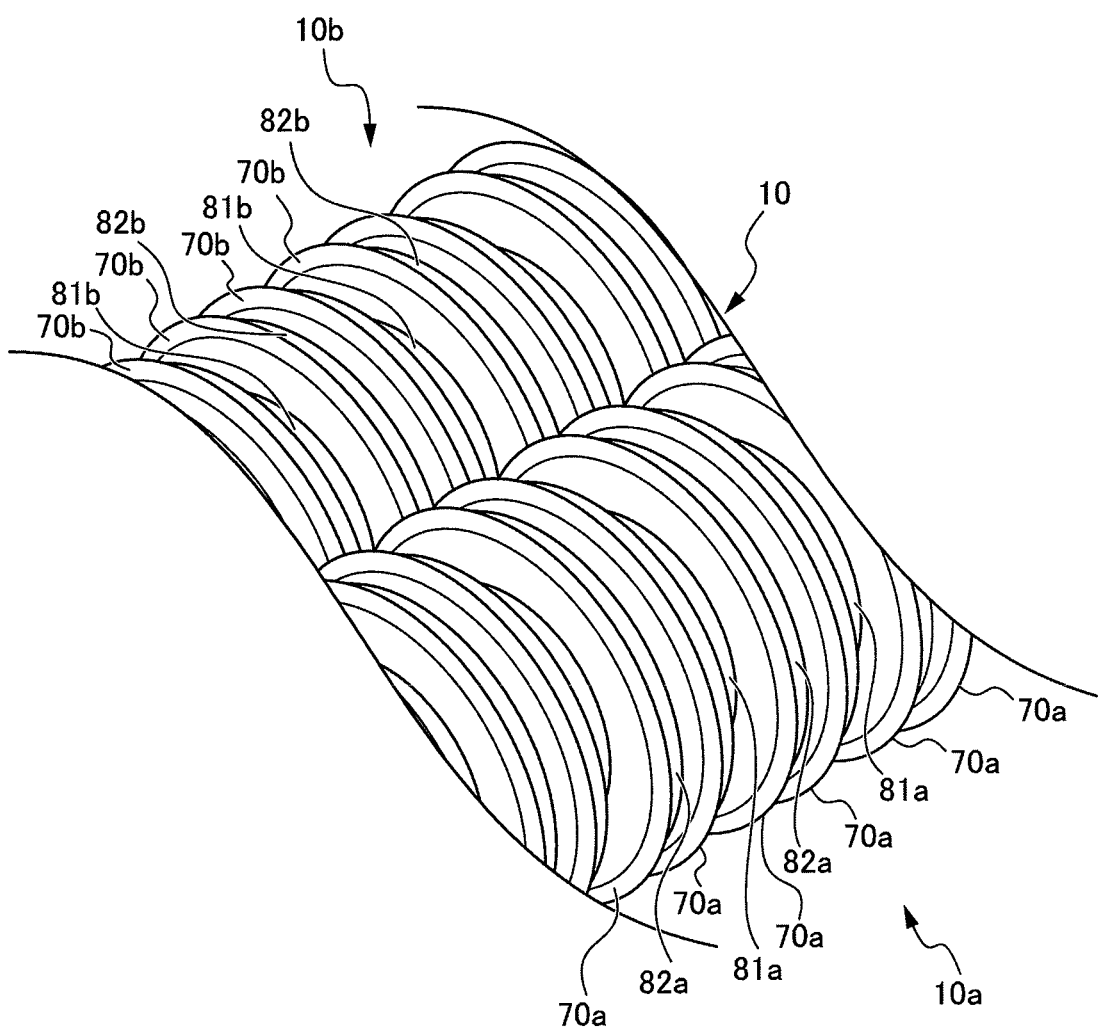
FIG. 4 is a partially enlarged view of the first roller 10a having cutting blades and the second roller 10b having cutting blades.
Figure 5:
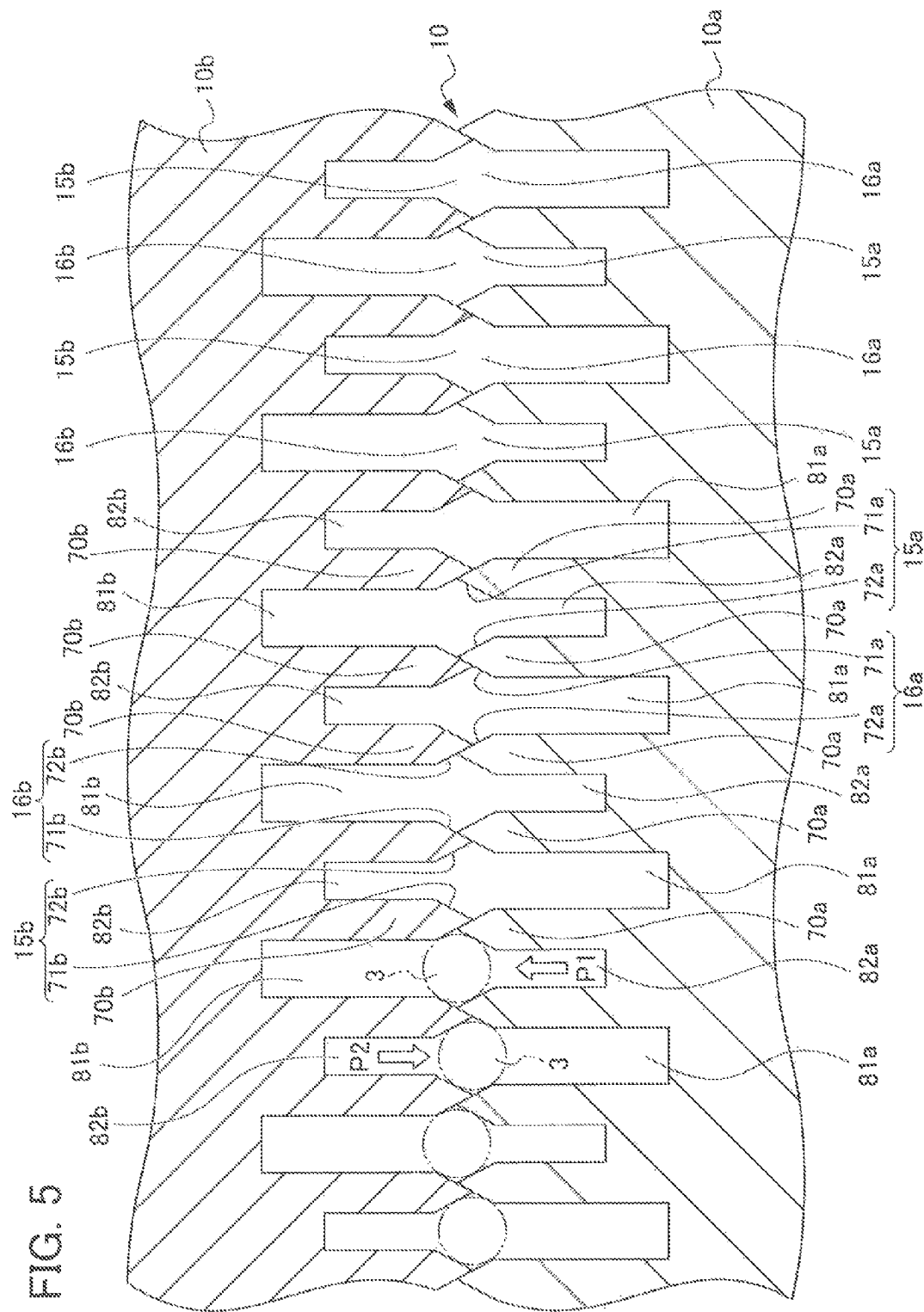
FIG. 5 is a view illustrating a state of the first roller 10a having cutting blades meshing with the second roller 10b having cutting blades.
Figure 6:
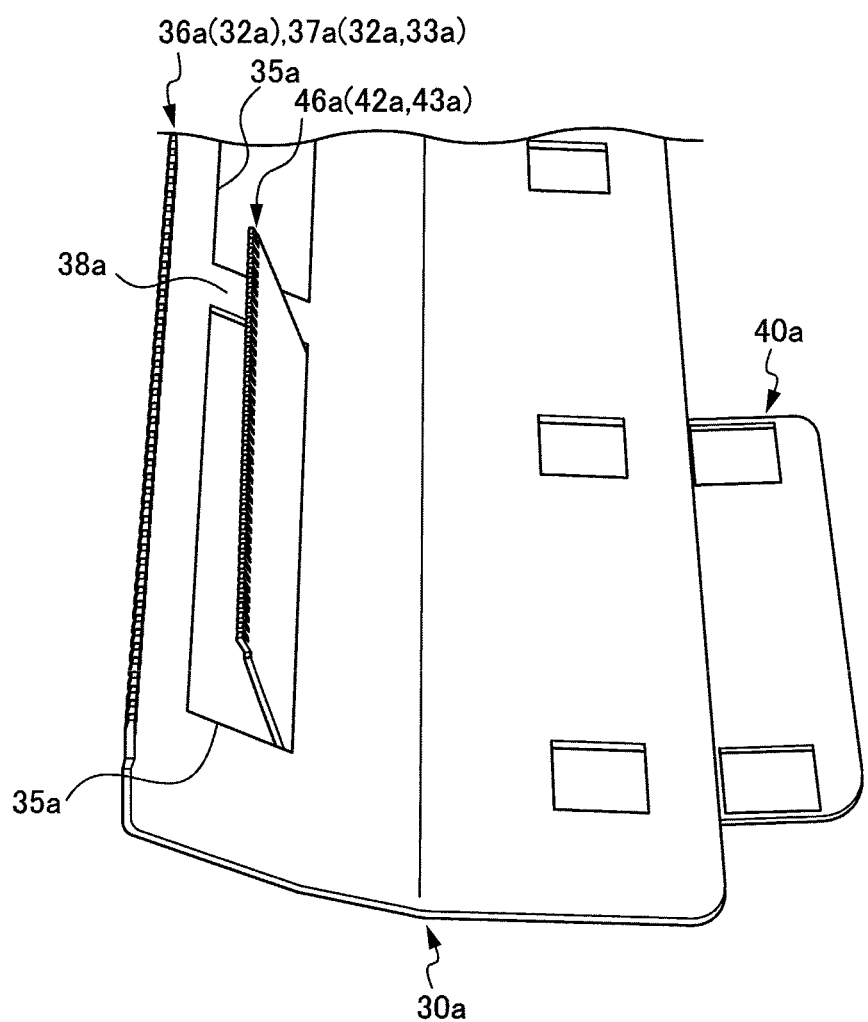

In the following, a description is given of an apparatus for cutting out noodle according to a first embodiment of the present invention. FIG. 1 is a cross-sectional view illustrating a structure of an apparatus 1 for cutting out noodle according to a first embodiment. FIG. 2 is a perspective view of the apparatus 1 for cutting out noodle shown in FIG. 1, as seen from below. FIG. 3 is a plan view illustrating a first roller 10a having cutting blades 70a and a second roller 10b having cutting blades 70b. FIG. 4 is a partially enlarged view of the first roller 10a and the second roller 10b. FIG. 5 is a view illustrating a meshing state between the first roller 10a and the second roller 10b. FIG. 6 is a perspective view illustrating an arrangement of a first scraper 30a and a second scraper 40a. FIG. 7 is a perspective view showing a state in which the first scraper 30a is separated from the second scraper 40a.

Figure 8A:
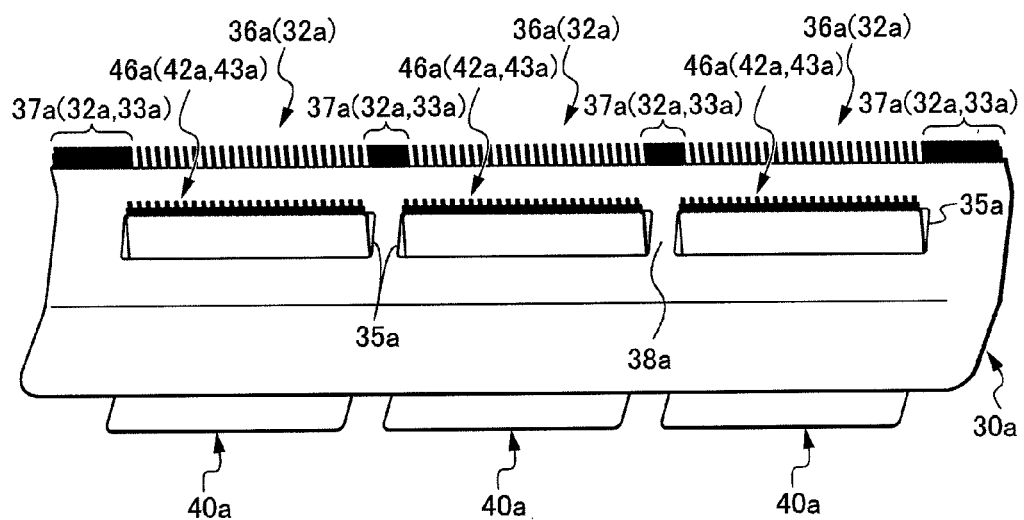
Figure 8B:
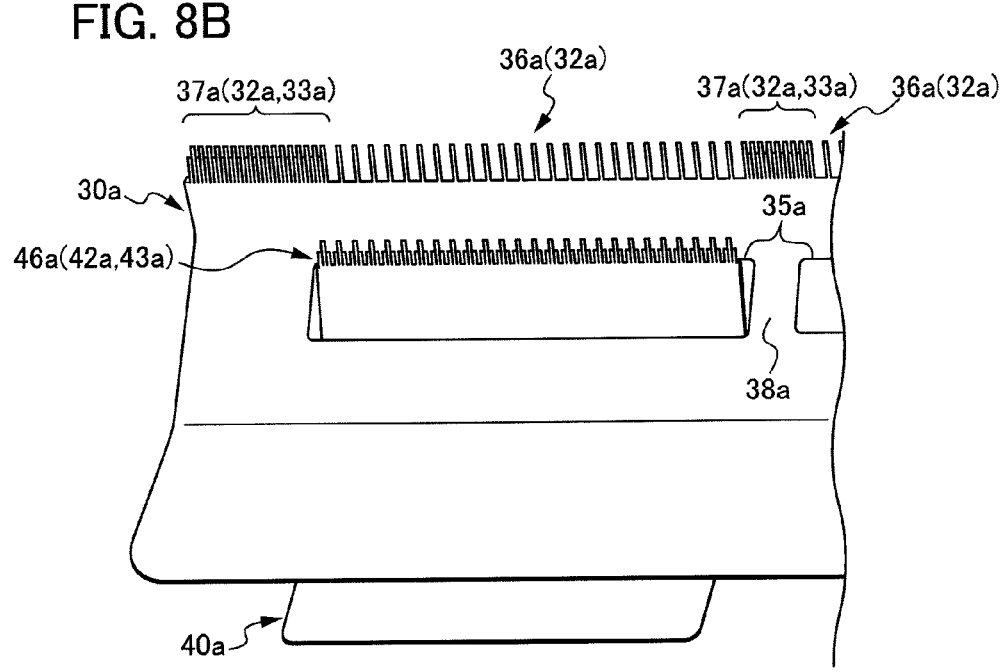
FIG. 8B is a partially enlarged view of FIG. 8A.
Figure 9A:
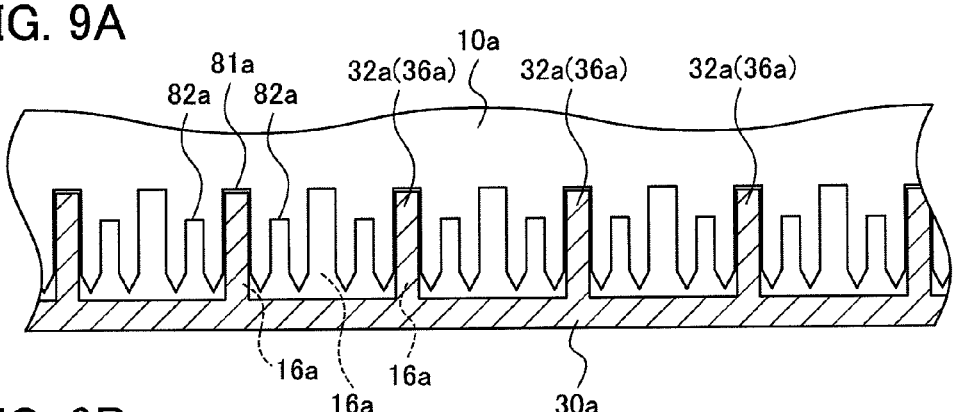
Figure 9B:
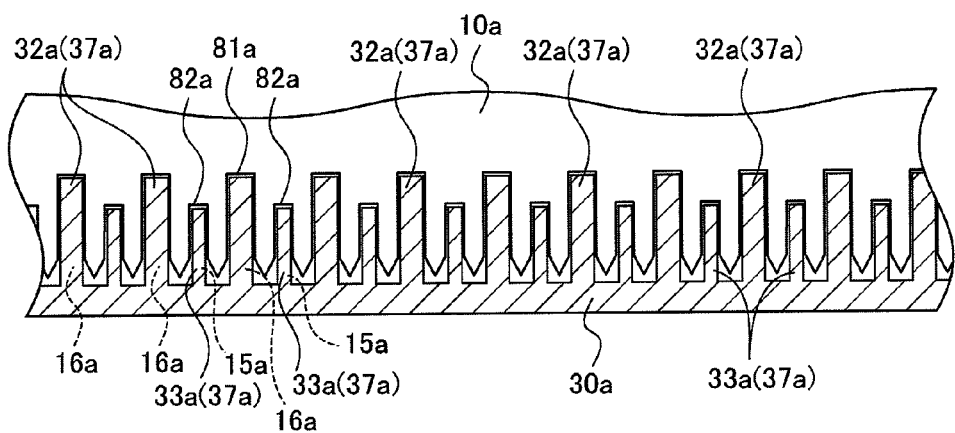
Figure 9C:
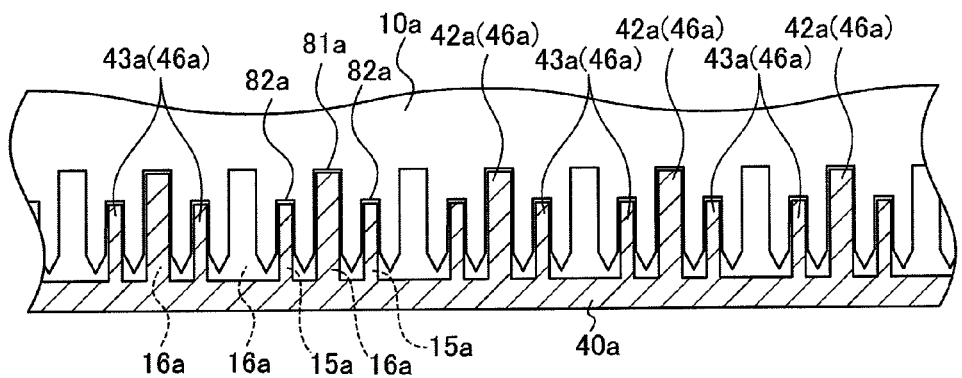
Figure 10:
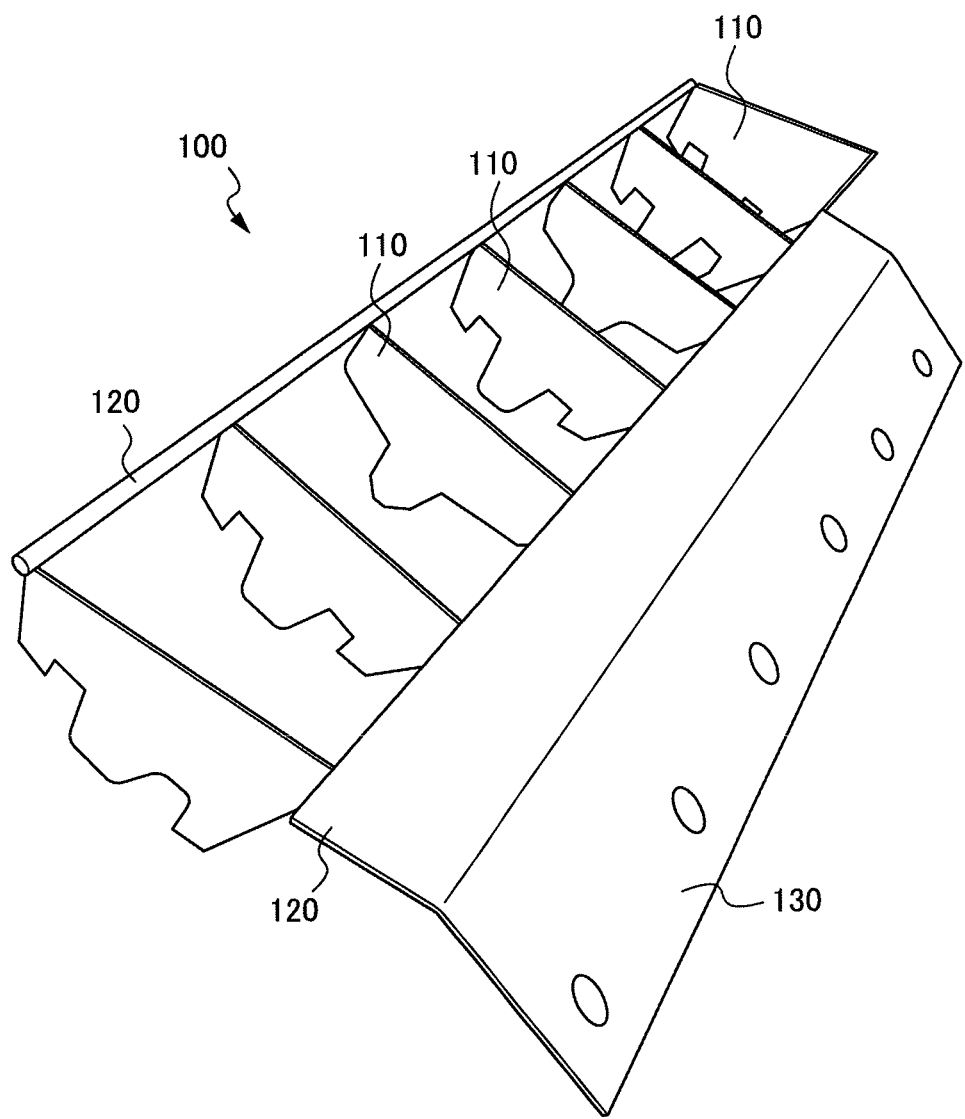
FIG. 10 is a perspective view showing a partition member 100.
Figure 11:
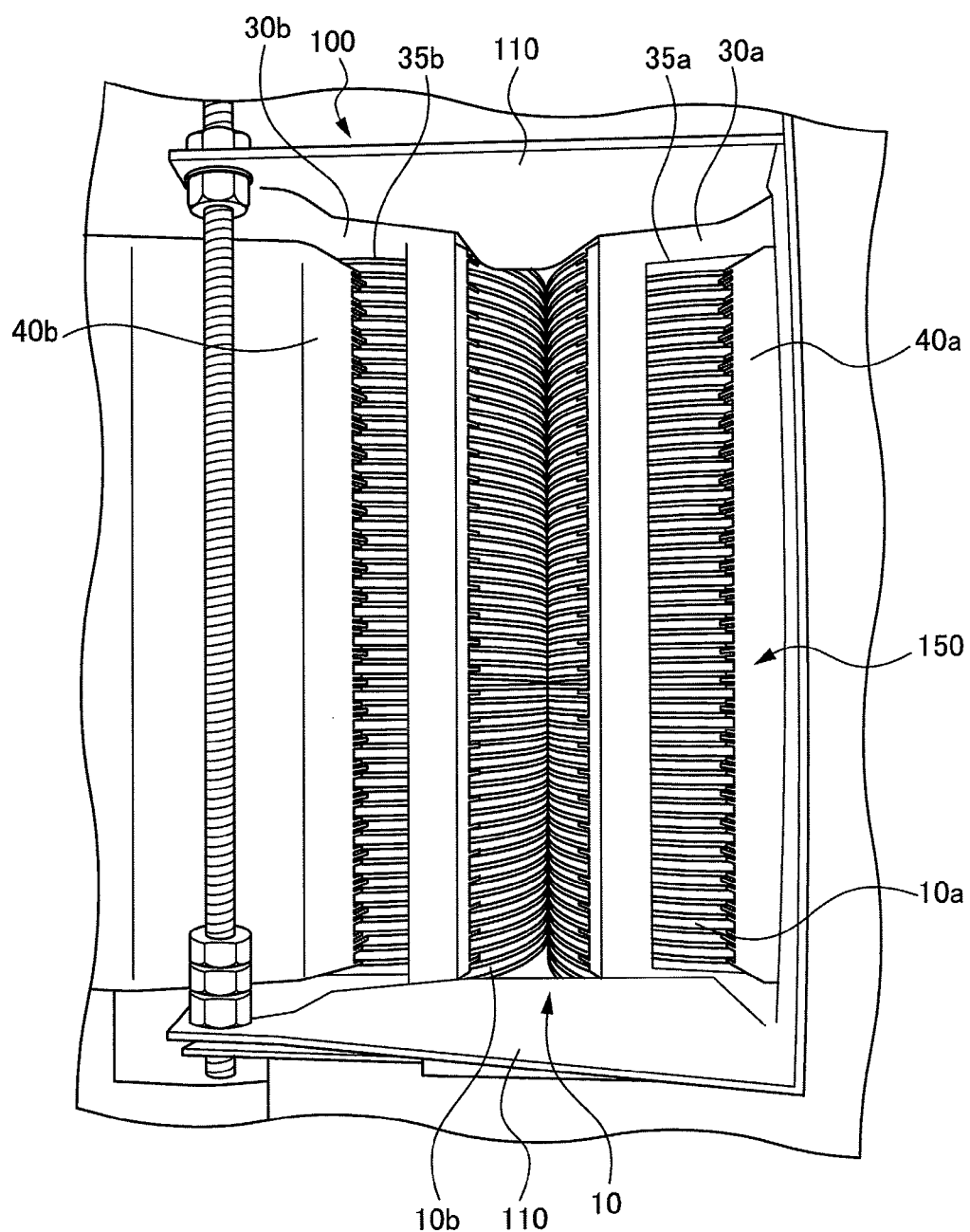
FIG. 11 is a perspective view of a state in which the partition member 100 is mounted, as seen from below.
Figure 12:
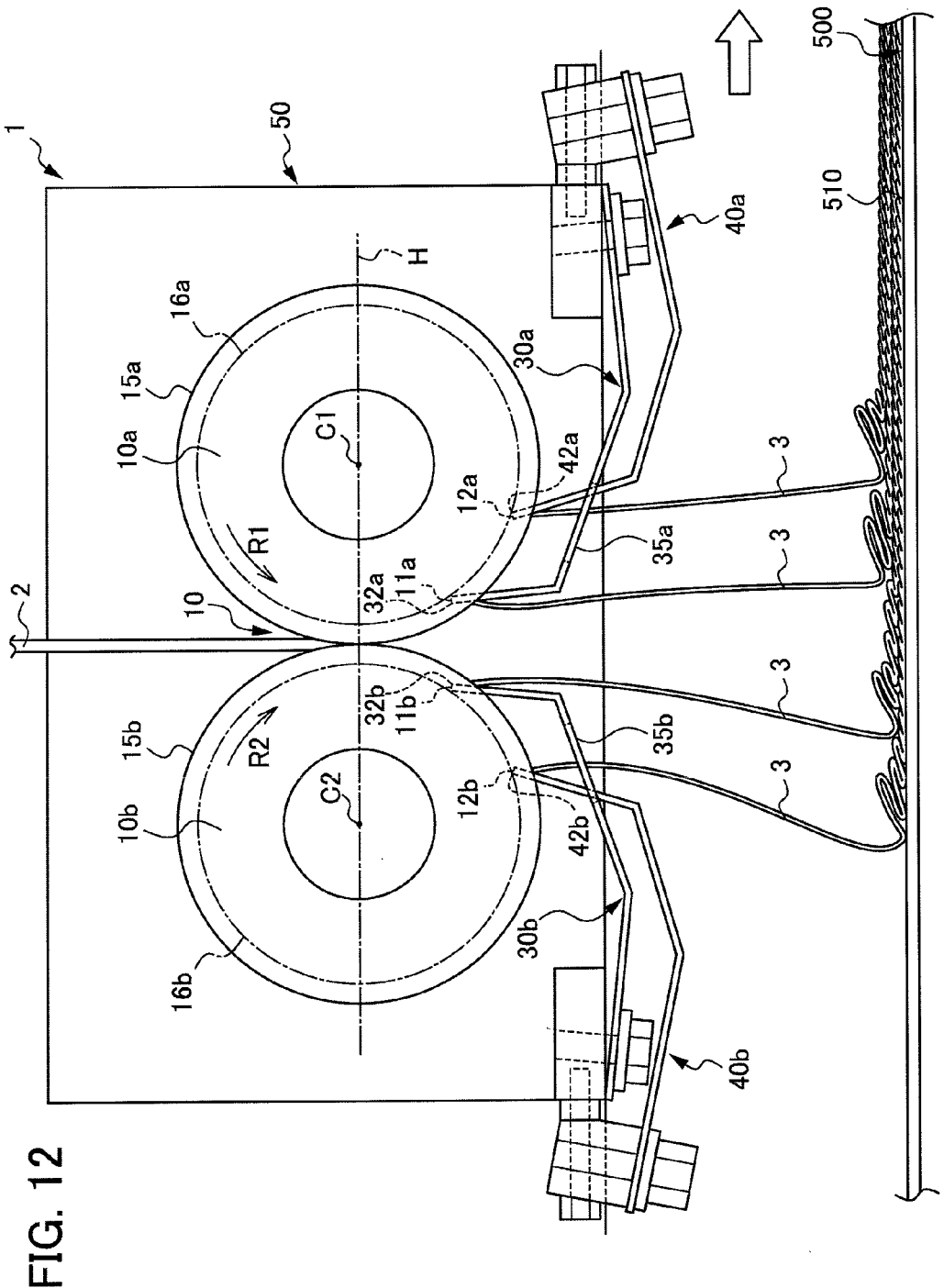
FIG. 12 is a view of a state in which a plurality of raw noodle threads 3 is cut out in the apparatus 1 for cutting out noodle according to the first embodiment.

FIG. 8A is a view illustrating an arrangement of teeth at the first scraper 30a and the second scraper 40a. FIG. 8B is a partially enlarged view of FIG. 8A. FIG. 9A is a view illustrating an arrangement of a group of first teeth 36a at the first scraper 30a. FIG. 9B is a view illustrating an arrangement of a group of second teeth 37a at the first scraper 30a. FIG. 9C is a view illustrating an arrangement of teeth 46a at the second scraper 40a. FIG. 10 is a perspective view showing a partition member 100. FIG. 11 is a perspective view of a state in which the partition member 100 is mounted, as seen from below. FIG. 12 is a view of a state in which a plurality of raw noodle threads 3 is cut out in the apparatus 1 for cutting out noodle according to the first embodiment.

As shown in FIG. 12, the apparatus 1 for cutting out noodle according to the first embodiment is an apparatus that cuts out a noodle strip 2 to form a plurality of raw noodle threads 3.

Firstly, a structure of the apparatus 1 according to the first embodiment is described with reference to FIGS. 1 to 11.

The apparatus 1 according to the first embodiment is an example provided with a roller having round cutting blades (producing noodle threads with a substantially circular cross section).

As shown in FIGS. 1 to 3, the apparatus 1 according to the first embodiment includes a housing 50, a first roller 10a having cutting blades 70a (also referred to as cutting blade portions 70a or blade portions 70a), a second roller 10b having cutting blades 70b (also referred to as cutting blade portions 70b or blade portions 70b), a first scraper 30a, a second scraper 40a, a third scraper 30b, and a fourth scraper 40b.

The housing 50 includes a first rectangular frame 56 (see FIG. 3), a second rectangular frame 57 (see FIG. 3), a first lateral linking member 51a, a second lateral linking member 52a, a third lateral linking member 51b, and a fourth lateral linking member 52b. Furthermore, the housing 50 includes a rod-shaped or plate-shaped (block-shaped) member (not shown) that extends in an axial direction of a first rotation axis C1 of the first roller 10a and a second rotation axis C2 of the second roller 10b, or a rod-shaped or plate-shaped (block-shaped) member (not shown) that extends in an orthogonal direction to the axial direction of the first rotation axis C1 and the second rotation axis C2.

The first rectangular frame 56 and the second rectangular frame 57 include two pairs of through holes (not shown) into which an axial member of each of the first roller 10a and the second roller 10b is inserted. By way of the two pairs of through holes, the first roller 10a and the second roller 10b can be rotationally supported.

The first lateral linking member 51a, the second lateral linking member 52a, the third lateral linking member 51b, and the fourth lateral linking member 52b are composed of a rod-shaped or plate-shaped (block-shaped) member (not shown) that extends in an axial direction of the first rotation axis C1 and the second rotation axis C2.

The first scraper 30a, the second scraper 40a, the third scraper 30b, and the fourth scraper 40b are attached to the first lateral linking member 51a, the second lateral linking member 52a, the third lateral linking member 51b, and the fourth lateral linking member 52b, respectively. A carrier conveyor 500 is disposed below the housing 50.

As shown in FIGS. 1 to 5, the first roller 10a having cutting blades 70a is configured to be rotatable in a first rotation direction R1 about the first rotation axis C1. The first roller 10a includes a plurality of first pushing portions 15a (portions having a thin groove (a shallow groove) in a case of round teeth, generally)) that are each formed in a circumferential direction and a plurality of first receiving portions 16a (portions having a thick groove (a deep groove) in a case of round teeth, generally) that are each formed between the plurality of first pushing portions 15a. The plurality of first pushing portions 15a and the plurality of first receiving portions 16a are formed aligned alternately with each other in an axial direction of the first rotation axis C1.

As shown in FIGS. 3 to 5, a plurality of blade portions 70a, a plurality of thick grooves 81a, and a plurality of thin grooves 82a are respectively formed in a circumferential direction at the first roller 10a. A thick groove 81a is formed between one blade portion 70a and another adjacent blade portion 70a lying on one side of the one blade portion 70a. A thin groove 82a is formed between the one blade portion 70a and another adjacent blade portion 70a lying on the other side of the one blade portion 70a.

As shown in FIG. 5, a blade portion 70a includes a slope 71a formed on one side (a left side in FIG. 5) of a tip side of the blade portion 70a and a slope 72a formed on the other side (a right side in FIG. 5) of the tip side of the blade portion 70a.

In addition, the plurality of thick grooves 81a and the plurality of thin grooves 82a are respectively formed aligned alternately with each other in an axial direction of the first rotation axis C1.

Here, the first pushing portion 15a is configured with the thin groove 82a, and the slope 71a and the slope 72a that are formed continuous with lateral sides of the thin groove 82a at the tip side of the thin groove 82a.

In addition, the first receiving portion 16a is configured with the thick groove 81a, and the slope 72a and the slope 71a that are formed continuous with lateral sides of the thick groove 81a at the tip side of the thick groove 81a.

As described above, the plurality of first pushing portions 15a is spaced with a predetermined distance in an axial direction of the first rotation axis C1. The plurality of first pushing portions 15a is respectively formed between the plurality of first receiving portions 16a. That is, a first pushing portion 15a and a first receiving portion 16a are formed alternately and continuously in the axial direction of the first rotation axis C1.

As shown in FIGS. 1 to 5, the second roller 10b having cutting blades 70b is configured to be rotatable in a second rotation direction R2 which is opposite to the first rotation direction R1 about the second rotation axis C2 which is parallel with the first rotation axis C1. The second roller 10b includes a plurality of second pushing portions 15b that are each formed in a circumferential direction and a plurality of second receiving portions 16b that are each formed between the plurality of second pushing portions 15b. The plurality of second pushing portions 15b and the plurality of second receiving portions 16b are respectively formed aligned alternately in an axial direction of the second rotation axis C2.

As shown in FIGS. 3 to 5, a plurality of blade portions 70b, a plurality of thick grooves 81b, and a plurality of thin grooves 82b are respectively formed in a circumferential direction at the second roller 10b. A thick groove 81b is formed between one blade portion 70b and another adjacent blade portion 70b lying on one side of the one blade portion 70b. A thin groove 82b is formed between the one blade portion 70b and another adjacent blade portion 70b lying on the other side of the one blade portion 70b.

As shown in FIG. 5, the blade portion 70b includes a slope 71b formed on one side (a right side in FIG. 5) of a tip side of the blade portion 70b and a slope 72b formed on the other side (a left side in FIG. 5) of the tip side of the blade portion 70b.

In addition, the plurality of thick grooves 81b and the plurality of thin grooves 82b are respectively formed aligned alternately with each other in an axial direction of the second rotation axis C2.

Here, the second pushing portion 15b is configured with the thin groove 82b, and the slope 71b and the slope 72b that are formed continuous with lateral sides of the thin groove 82b at the tip side of the thin groove 82b.

In addition, the second receiving portion 16b is configured with the thick groove 81b, and the slope 72b and the slope 71b that are formed continuous with lateral sides of the thick groove 81b at the tip side of the thick groove 81b.

As described above, the plurality of second pushing portions 15b is spaced with a predetermined distance in the axial direction of the second rotation axis C2. The plurality of second pushing portions 15b is respectively formed between the plurality of second receiving portions 16b. That is, the second pushing portion 15b and the second receiving portion 16b are formed alternately and continuously in the axial direction of the second rotation axis C2.

As shown in FIGS. 1 to 5, the second roller 10b having cutting blades 70b is disposed so as to mesh with the first roller 10a having cutting blades 70a at a prescribed meshing position 10. The meshing position 10 is formed on a plane H including the first rotation axis C1 and the second rotation axis C2.

As shown in FIGS. 3 and 5, at the meshing position 10, each of the plurality of first pushing portions 15a of the first roller 10a is in mesh with each of the plurality of second receiving portions 16b of the second roller 10b. In addition, at the meshing position 10, each of the plurality of second pushing portions 15b of the second roller 10b is in mesh with each of the plurality of first receiving portions 16a of the first roller 10a.

Specifically, at the meshing position 10, a slope of each of the plurality of blade portions 70a of the first roller 10a lies adjacent to or abuts a slope of each of the plurality of blade portions 70b of the second roller 10b.

More specifically, at the meshing position 10, the blade portion 70a is in mesh with the blade portion 70b. When a blade portion 70a and a blade portion 70b are in meshed with each other, outside slopes 71b and 72b of blade portions 70b adjacent to each other forming a thin groove 82b of the second roller 10b abut inside slopes 71a and 72a of blade portions 70a adjacent to each other forming a thick groove 81a of the first roller 10a.

Similarly, when a blade portion 70a and a blade portion 70b are in mesh with each other, outside slopes 71a and 72a of blade portions 70a adjacent to each other forming a thin groove 82a at the first roller 10a abut inside slopes of blade portions 70b adjacent to each other forming a thick groove 81b at the second roller 10b.

With the formation of the meshed state as described above, the noodle strip 2 (see FIG. 12) is sheared into a plurality of raw noodle threads 3 as shown in FIG. 5. More specifically, the noodle strip 2 is sheared so as to be formed into the plurality of raw noodle threads 3. The raw noodle threads 3 thus formed are pushed into the second receiving portion 16b of the second roller 10b by the first pushing portion 15a of the first roller 10a. In addition, the raw noodle threads 3 thus formed are pushed into the first receiving portion 16a of the first roller 10a by the second pushing portion 15b of the second roller 10b.

The raw noodle threads 3 that are pushed into each of the receiving portions 16b and 16a are formed to have cross sections in a round or nearly round shape. Then, the raw noodle threads 3 pushed into each of the receiving portions are scraped by respective scrapers described later.

It should be noted that, in the abovementioned description, although the angles of the slopes 71a and 71b on one side, which are formed at the tip of the blade portions 70a and 70b and the slopes 72a and 72b on the other side are the same, the present invention is not limited thereto.

Angles of the two slopes may be configured different from each other. For example, an angle of the slopes forming the pushing portions 15a and 15b can be made larger (lessening the inclination) or an angle of the slopes forming the receiving portions 16a and 16b can be made smaller (steepening the inclination). In this case, since the angle of the two slopes forming the pushing portions 15a and 15b becomes larger accordingly, the raw noodle threads 3 (which are cut out from the noodle strip 2) can be preferably pushed into the receiving portions 16b and 16a.

As shown in FIGS. 1 and 2, the first scraper 30a and the second scraper 40a are provided for the first roller 10a. The third scraper 30b and the fourth scraper 40b are provided for the second roller 10b. Each scraper is attached to the housing 50 so that an angle (contact angle) formed by a tooth tip and a tangent to a roller having cutting blades into which the tooth tip is inserted is in a range from approximately 10 degrees to 60 degrees. In addition, it is preferable that a scraper is set within this range as appropriate at a position where noodle threads can be easily scraped and teeth tips of the scraper are not worn as much as possible.

Arrangements, shapes, and the like of the third scraper 30b and the fourth scraper 40b provided for the second roller 10b are the same as those of the first scraper 30a and the second scraper 40a provided for the first roller 10a, respectively. Accordingly, descriptions relating to the first scraper 30a and the second scraper 40a are utilized for the descriptions relating to the third scraper 30b and the fourth scraper 40b by replacing a suffix of a reference numeral such as "a" with "b" (for example, replacing "32a" with "32b").

Next, each of the scrapers 30a, 40a, 30b, and 40b is described.

As shown in FIGS. 1, 2, and 6 to 8B, each of the scrapers 30a, 40a, 30b, and 40b is composed of a plate-shaped member having a substantially rectangular shape, and has a substantially arched shape that is bent along one bending line or more (in the present embodiment, two lines).

As shown in FIGS. 8A to 9B, the first scraper 30a includes a group of first teeth 36a and a group of second teeth 37a at one end portion thereof. The group of first teeth 36a is composed of a plurality of first scraping teeth 32a. The plurality of first scraping teeth 32a is inserted into every other first receiving portion 16a in the axial direction of the first rotation axis C1. The group of second teeth 37a is formed so that a plurality of the first scraping teeth 32a and first cleaning teeth 33a are aligned alternately. The first scraping teeth 32a are inserted into each of the first receiving portions 16a in the axial direction of the first rotation axis C1. The first cleaning teeth 33a are inserted into the thin grooves 82a forming the first receiving portion 15a. The group of first teeth 36a is disposed geometrically in line with a first transfer hole 35a (the second scraper 40a). The group of second teeth 37a is disposed at a position (including a beam-like strip 38a) that is not geometrically in line with the first transfer hole 35a. That is, the group of first teeth 36a and the group of second teeth 37a are aligned alternately in the axial direction of the first rotation axis C1.

Here, each of the plurality of first scraping teeth 32a and the plurality of second scraping teeth 42a (described later) are "teeth for scraping the raw noodle threads 3 that are respectively pushed into the plurality of first receiving portions 16a (the thick grooves 81a) and are in close contact with the inner face of the first receiving portions 16a." The first cleaning teeth 33a and second cleaning teeth 43a (described later) are not intended to scrape noodle threads, but to remove chaff in a thin groove forming a pushing portion.

The first scraper 30a includes a plurality of first transfer holes 35a (in the present embodiment, three). The first transfer holes 35a are provided so as to allow the raw noodle threads 3, which are scraped by the plurality of second scraping teeth 42a of the second scraper 40a to fall from each of the plurality of the first receiving portions 16a, to pass through below the first scraper 30a. In addition, the first transfer hole 35a is a hole through which the second scraper 40a is inserted.

As shown in FIGS. 8A, 8B, and 9C, the second scraper 40a includes a group of third teeth 46a at one end thereof. The group of third teeth 46a is formed by an arrangement of the plurality of second scraping teeth 42a and the plurality of cleaning teeth 43a, when the first scraper 30a and the second scraper 40a are attached to the housing 50. The second scraping teeth 42a are respectively inserted into the remainder of the first receiving portions 16a into which the plurality of first scraping teeth 32a of the first scraper 30a is not inserted. A second cleaning tooth 43a is inserted into the thin groove 82a forming the first pushing portion 15a.

It should be noted that the first scraping teeth 32a of the first scraper 30a and the second scraping teeth 42a of the second scraper 40a may be provided so that the first scraping teeth 32a and the second scraping teeth 42a are inserted into the first receiving portions 16a. In this case, in the first receiving portions 16a, noodle threads are scraped by any one of the first scraping teeth 32a and the second scraping teeth 42a; therefore, the other one of the first scraping teeth 32a and the second scraping teeth 42a functions as teeth (cleaning teeth) for cleaning chaff that is left in a thick groove, not for scraping the noodle threads.

In addition, the arrangement of the scraping teeth and the cleaning teeth is not particularly limited as long as the noodle threads can be scraped and the chaff can be cleaned at the first scraper 30a and the second scraper 40a.

As shown in FIGS. 1 and 2, the first scraper 30a is fixed at a first fixing position 53a of the housing 50. The first fixing position 53a according to the present embodiment lies on the first lateral linking member 51a. The second scraper 40a is fixed at a second fixing position 54a of the housing 50. The second fixing position 54a according to the present embodiment lies on the second lateral linking member 52a. The second lateral linking member 52a is located more outward in a horizontally outward direction HX than the meshing position 10.

Here, the term "the horizontally outward direction" refers to a direction away from the meshing position 10 in a horizontal direction H that is orthogonal to the first rotation axis C1 and the second rotation axis C2.

The first scraper 30a is fixed to the first lateral linking member 51a by way of a fixing bolt B1. A washer member B11 is interposed between the first lateral linking member 51a and the fixing bolt B1. The second scraper 40a is fixed to the second lateral linking member 52 by way of a fixing bolt B2. A washer member B21 is interposed between the second lateral linking member 52a and a fixing bolt B2.

The first fixing position 53a is located more outward in the horizontally outward direction HX than the second teeth tips 44a of the second scraping teeth 42a. In the horizontal direction H, the distance from the second teeth tips 44a of the second scraping teeth 42a to the first fixing position 53a is appropriately set based on, for example, a trajectory of noodle threads travelling, which are scraped from the first roller 10a by the second scraping teeth 42a of the second scraper 40a. The first fixing position 53a is located below the first roller 10a.

The second scraper 40a is multiply arranged (in the present embodiment, three) along the first rotation axis C1.

In the first scraper 30a, the first transfer hole 35a corresponds to the plurality of second scrapers 40a (in the present embodiment, three) and is multiply provided along the first rotation axis C1. The beam-like strip 38a is provided between the first transfer holes 35a that are adjacent to each other along the first rotation axis C1. Since this beam-like strip 38a is provided, a decrease in strength of the first scraper 30a due to providing the first transfer hole 35 can be reduced (reinforcing the first scraper 30a). In addition, since the beam-like strip 38a is provided, the adjacent first transfer holes 35a are not continuous with each other.

The second fixing position 54a is located more outward in the horizontally outward direction HX than the first fixing position 53a. At the second fixing position 54a, the second scraper 40a is disposed more apart from the first roller 10a than the first scraper 30a. In addition, the second scraper 40a, a closer side with respect to the second scraping teeth 42a, extends towards the first roller 10a via the first transfer hole 35a from a side of the first scraper 30a opposite to the first roller 10a. That is, the second scraper 40a intersects the first scraper 30a via the first transfer hole 35.

In addition, the second scraper 40*a* passes by an end position of the first transfer hole 35*a* in the horizontally outward direction HX. In this way, it is possible to ensure the maximum opening area of the first transfer hole 35*a*.

As shown in FIG. 1, at the first scraper 30*a*, each of the plurality of first teeth tips 34*a*, which are respectively teeth tips of the plurality of first scraping teeth 32*a*, is located at a position (11*a*) in a range of 5 degrees to 90 degrees, preferably 30 degrees to 60 degrees, from the meshing position 10 along the first rotation direction R1 about the first rotation axis C1.

In addition, at the second scraper 40*a*, each of the plurality of second teeth tips 44*a*, which are respectively teeth tips of the plurality of second scraping teeth 42*a*, is located at a position (12*a*) in a range of 30 degrees to 90 degrees, preferably 45 degrees to 60 degrees, from the meshing position 10 along the first rotation direction R1 about the first rotation axis C1.

In addition, regarding the second scraper 40*a*, the position 12*a* of a second tooth tip 44*a* is preferably located spaced apart from a first tooth tip 34*a* more than 30 degrees in the first rotation direction R1 about the first rotation axis C1. Here, the position of a tooth tip corresponds to a position facing the tooth tip at a bottom face of each of the receiving portions.

As described above, the descriptions relating to the first scraper 30*a* and the second scraper 40*a* are utilized in the descriptions relating to the third scraper 30*b* and the fourth scraper 40*b*, respectively; a main configuration of the third scraper 30*b* and the fourth scraper 40*b* is described below.

The third scraper 30*b* and the fourth scraper 40*b* are disposed with respect to the second roller 10*b* geometrically similarly to the first scraper 30*a* and the second scraper 40*a*. In this case, its rotation axis is the second rotation axis C2 and its rotation direction is the second rotation direction R2.

The third scraper 30*b* includes a second transfer hole 35*b*. The second transfer hole 35*b* is provided so as to allow the raw noodle threads 3, which are scraped by the plurality of fourth scraping teeth 42*b* of the fourth scraper 40*b* to fall from each of the plurality of the second receiving portions 16*b*, to pass through below the third scraper 30*b*.

The fourth scraper 40*b* is multiply arranged (three) along the second rotation axis C2. At the third scraper 30*b*, the second transfer hole 35*b* is multiply arranged (three) along the second rotation axis C2, corresponding to the plurality of fourth scrapers 40*b*. The second transfer holes 35*b*, which are adjacent to each other along the second rotation axis C2, are structurally discontinuous each other.

The third fixing position 53*b* is located more outward in the horizontally outward direction HX than fourth teeth tips 44*b* of the fourth scraping teeth 42*b*. The fourth fixing position 54*b* is located below the second roller 10*b*.

The fourth fixing position 54*b* is located more outward in the horizontally outward direction HX than the third fixing position 53*b*. At the fourth fixing position 54*b*, the fourth scraper 40*b* is disposed more apart from the second roller 10*b* than the third scraper 30*b*. The fourth scraper 40*b*, a closer side with respect to the fourth scraping teeth 42*b*, extends towards the second roller 10*b* via the second transfer hole 35*b* from a side of the third scraper 30*b* opposite to the second roller 10*b*. The fourth scraper 40*b* passes by an end position of the second transfer hole 35*b* in the horizontally outward direction HX.

Next, a partition member 100 is described. The partition member 100 is used for dividing the noodle threads 3, which are cut out by both rollers 10*a* and 10*b*, and scraped by each of the scrapers 30*a*, 40*a*, 30*b*, and 40*b*, into pieces of a prescribed width (amount).

More specifically, as shown in FIG. 10, the partition member 100 includes a plurality of partition plates 110 arranged in parallel, a coupling member 120 coupling the plurality of partition plates 110, and a partitioner fixing member 130 that fixes the coupling member 120 to the housing 50.

When the partition member 100 is fixed to the housing 50 via the partitioner fixing member 130, as shown in FIG. 11, the plurality of partition plates 110 are arranged orthogonal to both the rotation axes C1 and C2. Then, by way of the plurality of partition plates 110, a space below the housing 50, particularly a space below each of the scrapers 30*a*, 40*a*, 30*b*, and 40*b*, can be divided into a plurality of spaces 150 that are arranged along both the rotation axes C1 and C2. By appropriately setting the spacing of the plurality of partition plates 110, the noodle threads 3 scraped by the scrapers can be divided into pieces of the prescribed width (amount).

Subsequently, with reference to FIG. 12, an operation of the apparatus 1 for cutting out noodle is described.

As shown in FIG. 12, a noodle strip 2 that is inserted into the meshing position 10 of the first roller 10*a* and the second roller 10*b* of the apparatus 1 is sheared at the meshing position 10 to be formed into a plurality of raw noodle threads 3.

The plurality of raw noodle threads 3 formed through being sheared (cut out) is inserted (pushed) into the plurality of receiving portions 16*a* of the first roller 10*a* and the plurality of second receiving portions 16*b* of the second roller 10*b*.

The first roller 10*a*, whose first receiving portions 16*a* are filled with the plurality of raw noodle threads 3, is rotated in the first rotation direction R1 about the first rotation axis C1. A part of the raw noodle threads 3 rotationally moved following the rotation of the first roller 10*a* is first scraped by the first scraper 30*a*. The raw noodle threads 3 scraped by the first scraper 30*a* hang down substantially in a vertical direction to fall onto the carrier conveyor 500 through a space between the first scraper 30*a* and the third scraper 30*b*.

Then, the remaining raw noodle threads 3 rotationally moved following the further rotation of the first roller 10*a* are scraped by the second scraper 40*a*. The raw noodle threads 3 scraped by the second scraper 40*a* hang down substantially in a vertical direction to pass through the first transfer hole 35 of the first scraper 30*a*, falling onto the carrier conveyor 500.

On the other hand, the second roller 10*b*, whose second receiving portions 16*b* are filled with the plurality of raw noodle threads 3, is rotated in the second rotation direction R2 about the second rotation axis C2. A part of the raw noodle threads 3 that rotationally moved following the rotation of the second roller 10*b* is first scraped by the third scraper 30*b*. The raw noodle threads 3 scraped by the third scraper 30*b* hang down substantially in a vertical direction to fall onto the carrier conveyor 500 through a space between the first scraper 30*a* and the third scraper 30*b*.

Then, the remaining raw noodle threads 3 rotationally moved following the further rotation of the second roller 10*b* are scraped by the fourth scraper 40*b*. The raw noodle threads 3 scraped by the fourth scraper 40*b* hang down substantially in a vertical direction to pass through the second transfer hole 35*b* of the third scraper 30*b*, falling onto the carrier conveyor 500.

The plurality of raw noodle threads 3 formed by the apparatus 1 for cutting out noodle is cut out onto a belt 510

(described later) at the carrier conveyor 500. In the present embodiment, the raw noodle threads 3 scraped by each of the first scraper 30a, the second scraper 40a, the third scraper 30b, and the fourth scraper 40b are placed on the belt 510 so as to be layered in order of the raw noodle threads 3 having been scraped, and are conveyed in layers, typically four layers.

The plurality of raw noodle threads 3 thus cut out is conveyed along with the movement of the belt 510 to a subsequent process.

Another process is provided as appropriate before or after the process of cutting out noodle threads by the apparatus 1 for cutting out noodle according to the first embodiment. For example, processing of forming a noodle strip that rolls noodle dough to form a noodle strip can be exemplified as pre-processing.

For example, processing of steaming raw noodle threads, processing of cooling the noodle threads thus steamed, processing of stretching the noodle threads, processing of trimming the noodle threads in a length direction, processing of drying the noodle, processing of packaging the noodles, and the like can be exemplified as post-processing.

The following effects are exerted, for example, according to the apparatus 1 for cutting out noodle of the first embodiment.

In the apparatus 1 for cutting out noodle according to the first embodiment, the first fixing position 53a of the first scraper 30a is positioned more outward in the horizontally outward direction HX than the position of the second teeth tips 44a of the second scraping teeth 42a, and the first fixing position 53b of the third scraper 30b is positioned more outward in the horizontally outward direction HX than the position of fourth teeth tips 44b of the fourth scraping teeth 42b.

Accordingly, it is possible to prevent noodle threads from sticking to each other and to prevent damage to scraping teeth of a scraper. In addition, for example, compared to the apparatus described in Unexamined Utility Model Application Publication No. S57-203787, it is possible to suppress failures such as: Noodle threads, which are scraped to fall from rollers having cutting blades by a scraper, are caught by another scraper located close to a meshing position of the rollers or the fixing position of the scraper. Accordingly, the noodle threads thus cut out do not fall onto a belt conveyor for conveying the noodle threads.

In addition, in the apparatus 1 for cutting out noodle according to the first embodiment, the first scraper 30a includes the first transfer hole 35a. In addition, the third scraper includes the second transfer hole 35b. Therefore, this allows the raw noodle threads 3, which are scraped to fall from each of the plurality of first receiving portions 16a by the plurality of second scraping teeth 42a of the second scraper 40a, to pass through below the first scraper 30a. In addition, this allows the raw noodle threads 3, which are scraped to fall from each of the plurality of second receiving portions 16b by the plurality of fourth scraping teeth 42b of the fourth scraper 40b, to pass through below the third scraper 30b.

Moreover, in the apparatus 1 for cutting out noodle according to the first embodiment, the second scraper 40a intersects the first scraper 30a via the first transfer 35a, and the fourth scraper 40b intersects the third scraper 30b via the second transfer hole 35b. Since the teeth tips tend to be worn down relatively higher due to influences such as an angle (contact angle) formed by the teeth tips and a tangent to the roller having cutting blades into which the teeth tips are inserted, the second scraper 40a and the fourth scraper 40b have higher replacement frequency. It is possible to replace the second scraper 40a and the fourth scraper 40b without removing the first scraper 30a and the third scraper 30b, which have lower replacement frequency. Therefore, it is possible to facilitate maintenance operations relating to replacement of scrapers.

Next, other embodiments of the present invention are described. For the other embodiments, different aspects from the first embodiment are mainly described. The same reference symbols or reference symbols with additional numerals are used for configurations similar to the first embodiment. Detailed descriptions thereof are omitted. The additional numerals are "200", "300", and "400" in a second embodiment to a fourth embodiment (described later), respectively. For example, relative to "the first scraper 30a" of the first embodiment, in the second embodiment, "a first scraper 230a" is used.

The descriptions of the first embodiment are applied as appropriate for aspects that are not described in particular in other embodiments. In addition, the effects similar to those of the first embodiment are exerted in other embodiments.

Second Embodiment

Figure 13A:
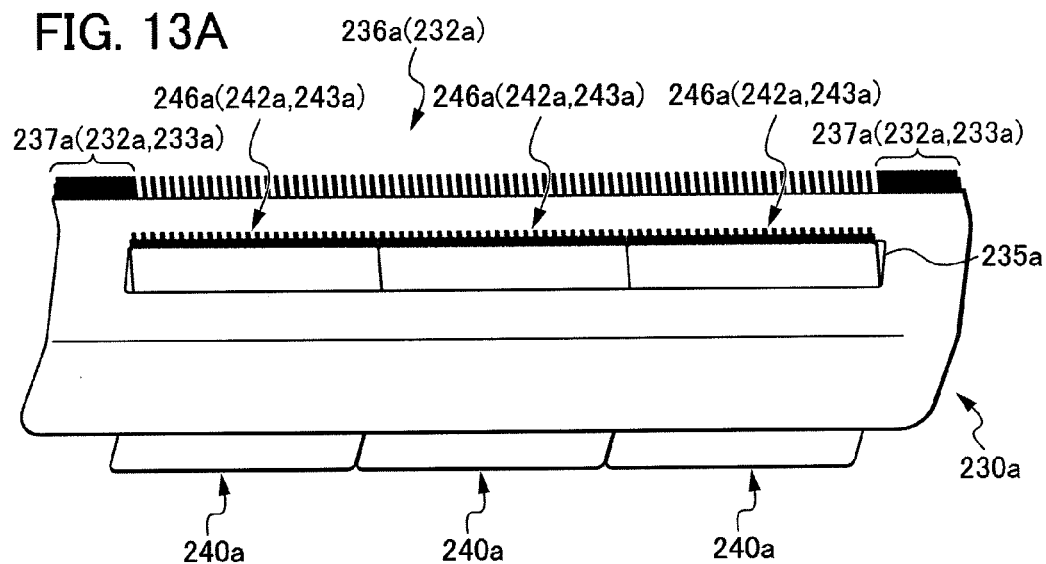
FIG. 13A is a base view showing a first scraper 230a and a second scraper 240a according to a second embodiment.
Figure 13B:
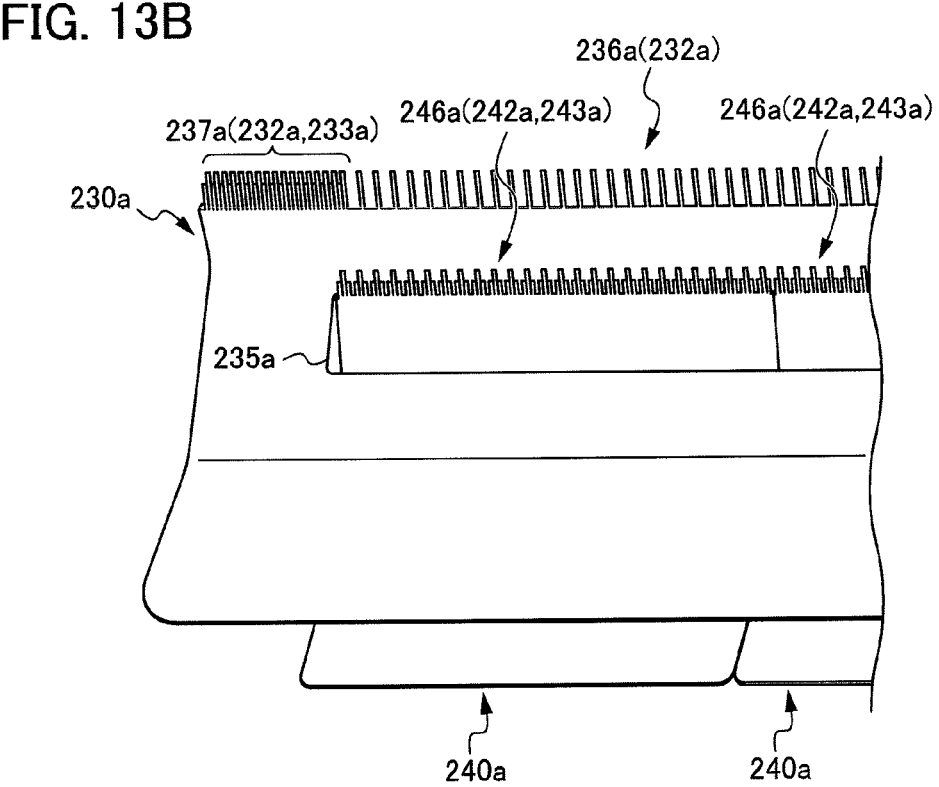
FIG. 13B is a partially enlarged view of FIG. 13A.

Next, a second embodiment is described. FIG. 13A is a base view showing a first scraper 230a and a second scraper 240 according to a second embodiment. FIG. 13B is a partially enlarged view of FIG. 13A.

As shown in FIGS. 13A and 13B, compared to the apparatus 1 for cutting out noodle according to the first embodiment, an apparatus according to the second embodiment is mainly different in the number of second scrapers 240a that are disposed in a single first transfer hole 235a.

More specifically, in the second embodiment, the single first scraper 230a is provided with the single first transfer hole 235a. Accordingly, the first scraper 230a is not provided with a beam-like strip 38a in the first embodiment. Furthermore, the first scraper 230a is not provided with a group of second teeth 37a corresponding to the beam-like strip 38a.

A length of the first transfer hole 235a in the second embodiment is approximately triple the length of the first transfer hole 35a in the first embodiment. In the second embodiment, three second scrapers 240a are disposed in the first transfer hole 235a of the first scraper 230a. The three second scrapers 40a are aligned in the axial direction of the first rotation axis C1 substantially without any space.

In this way, in the second embodiment, since the three second scrapers 240a are aligned in the axial direction of the first rotation axis C1 substantially without any space, it is not necessary to provide at a position corresponding to the beam-like strip 38a the group of the second teeth 37a including the first scraping teeth 32a and the first cleaning 33a alternately arranged, as described in the first embodiment. Accordingly, compared to the first embodiment in which the noodle threads may be less resistant to sticking to each other at the group of second teeth 37a, it may be possible that the second embodiment more efficiently prevents the noodle threads from sticking to each other.

In addition, since three second scrapers 240a are disposed in the first transfer hole 235a of the single first scraper 230a, for example, if a second scraper 240a is damaged, it is sufficient to replace only the damaged second scraper 240a, which results in efficient replacement of the second scraper 240a.

Third Embodiment

Figure 14A:
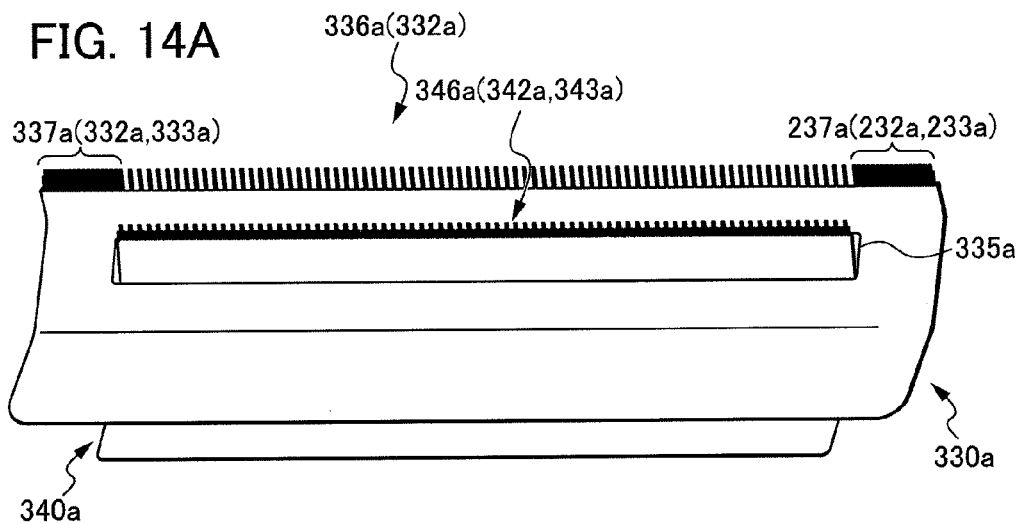
FIG. 14A is a base view showing a first scraper 330a and a second scraper 340a according to a third embodiment.
Figure 14B:
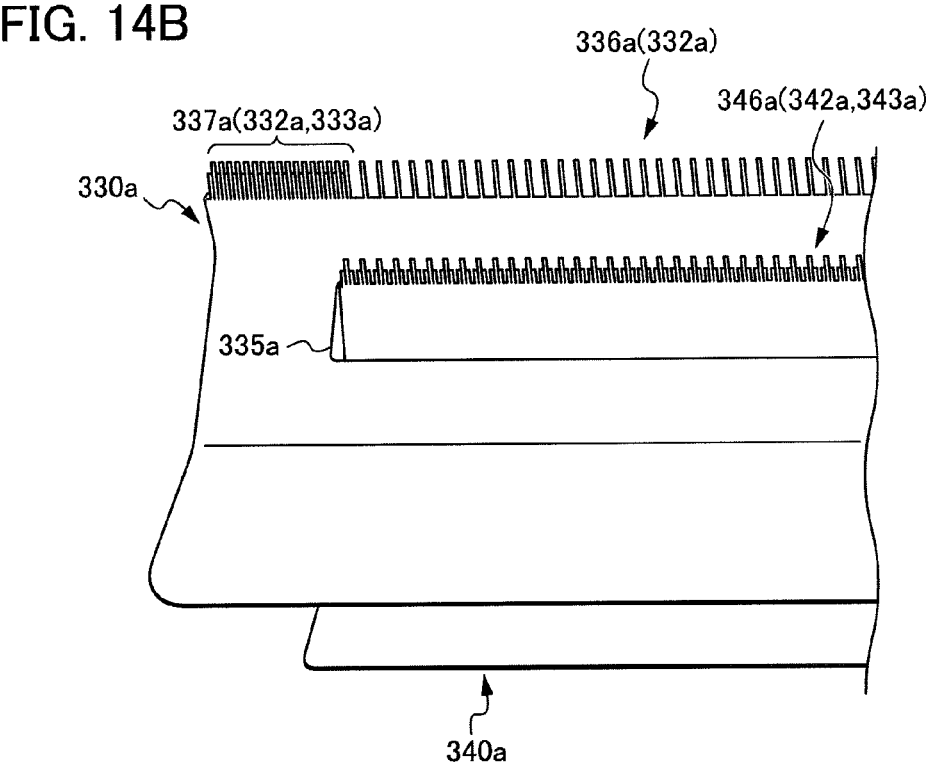
FIG. 14B is a partially enlarged view of FIG. 14A.

Next, a third embodiment is described. FIG. 14A is a base view showing a first scraper 330a and a second scraper 340a according to the third embodiment. FIG. 14B is a partially enlarged view of FIG. 14A.

As shown in FIGS. 14A and 14B, compared to the apparatus for cutting out noodle according to the second embodiment, an apparatus for cutting out noodle according to the third embodiment is mainly different in that a single first scraper 330a is provided with a single first transfer hole 335a and the single first transfer hole 335a is provided with a single second scraper 340a.

More specifically, in the third embodiment, the single first scraper 330a is provided with the single first transfer hole 335a similarly to the second embodiment. In addition, a length of the first transfer hole 335a of the third embodiment is approximately triple the length of the first transfer hole 35a of the first embodiment.

On the other hand, in the third embodiment, a single second scraper 340a is inserted into the first transfer hole 335a of the single first scraper 330a. A length of the second scraper 340a of the third embodiment is approximately triple the length of the second scraper 40a of the first embodiment. According to the third embodiment, the number of scrapers can be limited.

Fourth Embodiment

Figure 15:
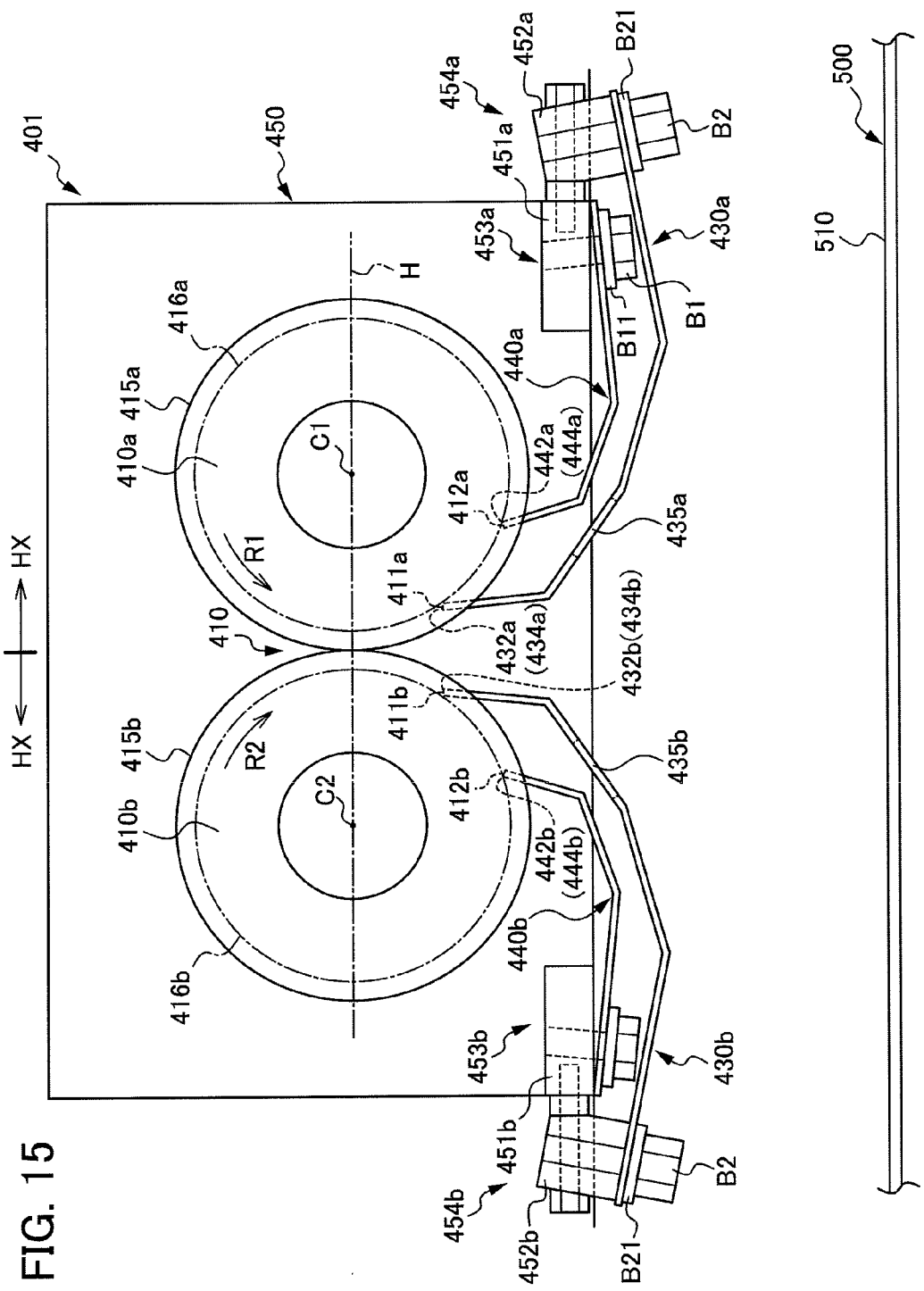
FIG. 15 is a cross-sectional view illustrating a structure of an apparatus 401 for cutting out noodle according to a fourth embodiment.
Figure 16:
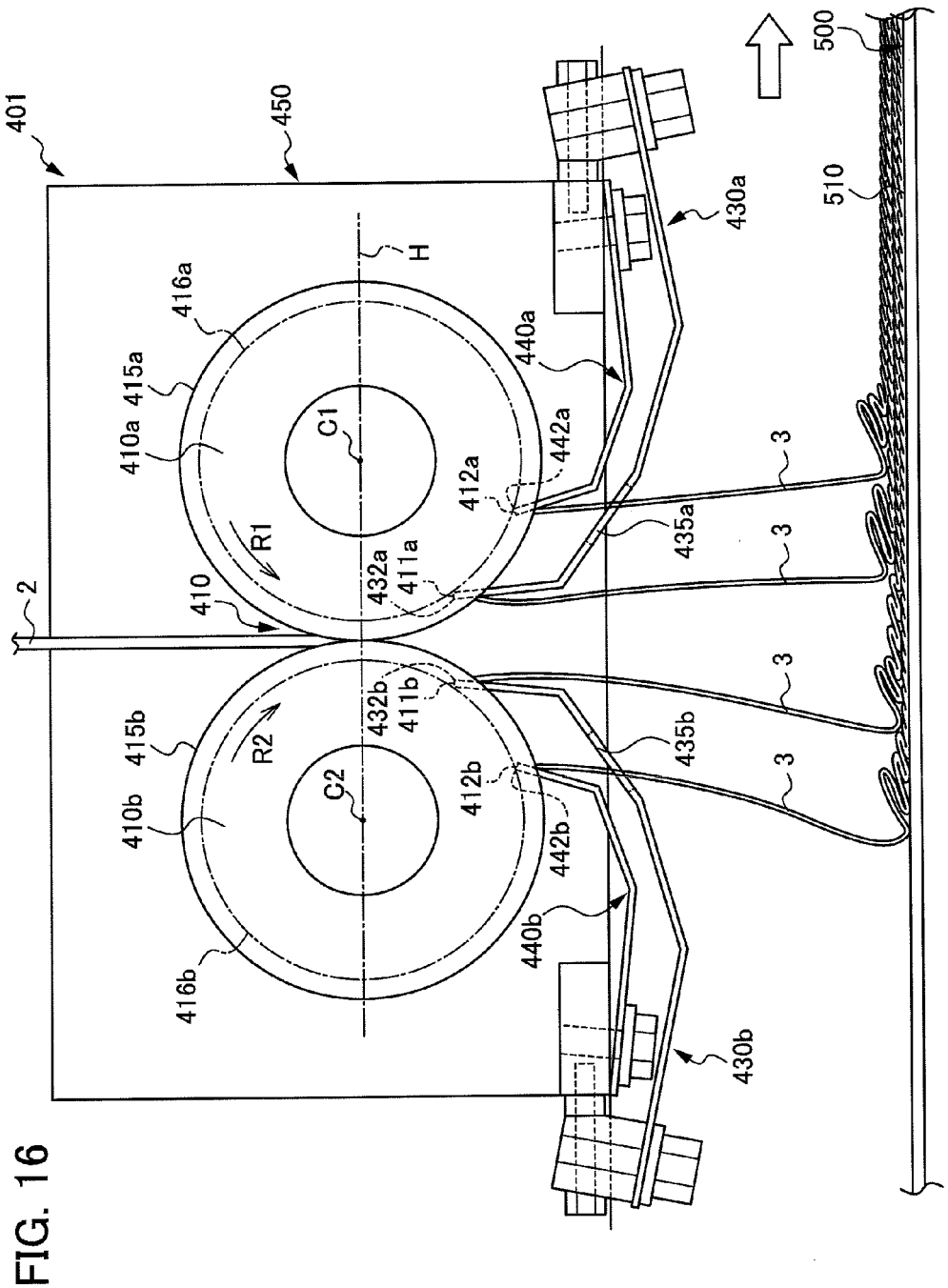
FIG. 16 is a view illustrating a state in which a plurality of raw noodle threads 3 is cut out in the apparatus 401 for cutting out noodle according to the fourth embodiment.

Next, a fourth embodiment is described. FIG. 15 is a cross-sectional view illustrating a structure of an apparatus 401 for cutting out noodle according to the fourth embodiment. FIG. 16 is a view illustrating a state in which a plurality of raw noodle threads 3 is cut out in the apparatus 401 according to the fourth embodiment.

As shown in FIG. 15, compared to the apparatus 1 for cutting out noodle according to the first embodiment, the apparatus 401 according to the fourth embodiment is mainly different in that a second scraper 440a is not inserted through a first transfer hole 435a of a first scraper 430a, and a fourth scraper 440b is not inserted through a second transfer hole 435b of a third scraper 430b.

More specifically, a second fixing position 454a is positioned more outward in the horizontally outward direction HX than a first fixing position 453a. The second scraper 440a is located closer to a first roller 410a having cutting blades than a first scraper 430a at the first fixing position 453a. Therefore, the second scraper 440a is located closer on a side of the first roller 410a than the first scraper 430a even if the second scraper 440a is not inserted through a first transfer hole 435a of the first scraper 430a.

Similarly, a fourth fixing position 454b is positioned more outward in the horizontally outward direction HX than a third fixing position 453b. The fourth scraper 440b is located closer to a second roller 410b having cutting blades than the third scraper 430b at the third fixing position 453b. Therefore, the fourth scraper 440b is located closer on a side of the second roller 410b than the third scraper 430b even if the fourth scraper 440b is not inserted through a second transfer hole 435b of the third scraper 430b.

More specifically, in the fourth embodiment, the first transfer hole 435a is only provided so as to allow raw noodle threads 3, which are scraped by a plurality of second scraping teeth 442a of the second scraper 440a to fall from respective receiving portions 416a, to pass through below the first scraper 430a. Similarly, the second transfer hole 435b is only provided so as to allow the raw noodle threads 3, which are scraped by a plurality of second scraping teeth 442b of the fourth scraper 440b to fall from respective second receiving portions 416b, to pass through below the third scraper 430b.

Although not described in detail, as shown in FIG. 16, the apparatus 401 for cutting out noodle according to the fourth embodiment operates in a similar manner as the apparatus 1 for cutting out noodle according to the first embodiment, except for differences in the positional relationship between the first scraper 430a and the second scraper 440a and between the third scraper 430b and the fourth scraper 440b.

The apparatuses for cutting out noodle according to the previously described embodiments are of a round-blade type, in which a cross-section of a noodle thread cut out is shaped substantially round. However, the present invention is not limited to this type. The apparatus for cutting out noodle according to the present invention can be applied to other types of apparatus, which employ a square blade producing a cross section shaped in a square, a blade of kitchen knife type or other types of blades.

Figure 17A:
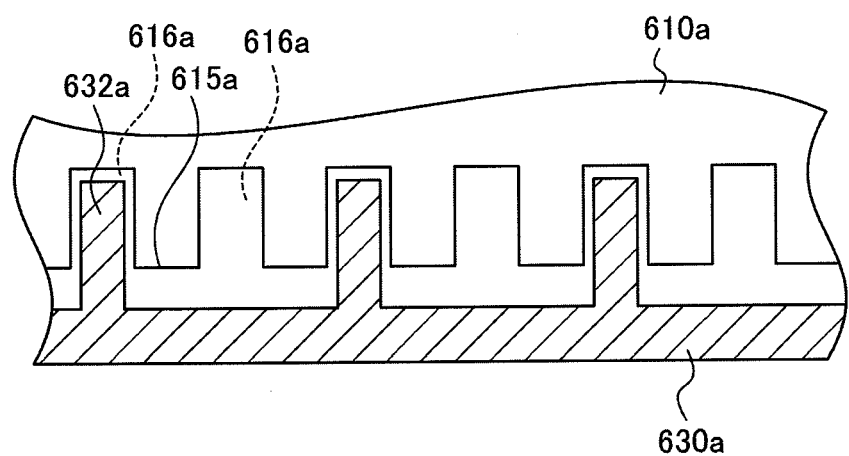
FIG. 17A is a view illustrating an arrangement of a first scraping tooth 632a of a first scraper 630a at a roller having square cutting blades.
Figure 17B:
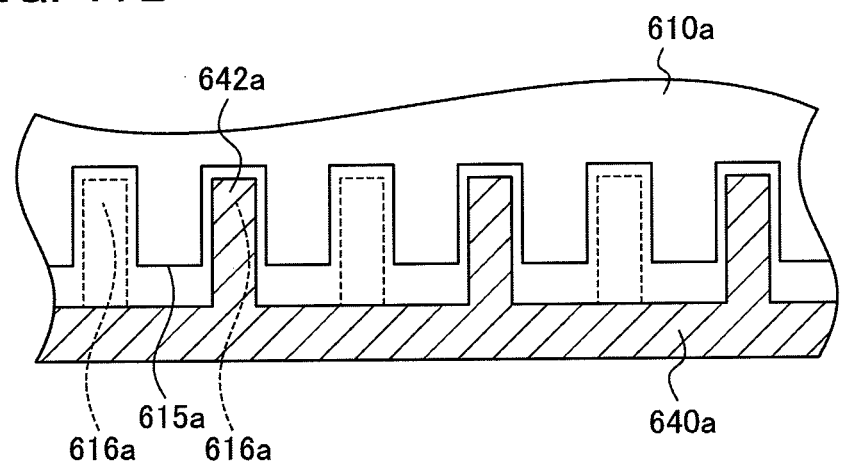
FIG. 17B is a view illustrating an arrangement of a second scraping tooth 642a of a second scraper 640a at a roller having square cutting blades.

In the following, a brief description is given of a case in which a roller having cutting blades is of square blade type with reference to FIGS. 17A and 17B. FIG. 17A is a view illustrating an arrangement of first scraping teeth 632a of a first scraper 630a at a roller 610a having square cutting blades. FIG. 17B is a view illustrating an arrangement of second scraping teeth 642a of a second scraper 640a at the roller 610a.

As shown in FIGS. 17A and 17B, a convex portion (a thread portion) and a concave portion (a groove portion) having a cross-section of a rectangular shape are formed alternately and continuously for the roller 610a in a direction of a rotation axis (not shown). In an apparatus for cutting out noodle of a square blade type, a convex portion 615a corresponds to a pushing portion 15a (a portion including a thin groove) associated with the apparatus 1 for cutting out noodle (round blade type) according to the first embodiment as described above, and a concave portion 616a corresponds to a receiving portion 16a (a portion including a thick groove).

In a case of an apparatus of a square blade type, the pushing portion does not include the thin groove adopted by the apparatus of a round blade type. Therefore, each scraper does not include cleaning teeth for thin grooves and only includes scraping teeth 632a and 642a.

In addition, a cross-section of the roller 610a perpendicular to the rotation axis is approximately the same as that shown in FIG. 1 according to the apparatus 1 for cutting out noodle of a round blade type.

Similar to the apparatus for cutting out noodle of a round blade type, in the apparatus for cutting out noodle of a square blade type, a first roller having cutting blades is in mesh with a second roller having cutting blades at a meshing position, and a pushing portion (the convex portion 615a) pushes a thin noodle strip into a receiving portion (the concave portion 616a) so as to be linearly sheared into noodle threads. The noodle strip (the noodle threads) pushed into the receiving portion (the concave portion 616a) is scraped to be cut out by the scraping teeth of each of the first scraper 630a and the second scraper 640a disposed at the first roller 610a and the third scraper and the fourth scraper disposed at the second roller.

The scraping teeth 632a of the first scraper 630a are disposed so as to be inserted into the every other receiving portion (the concave portion 616a) at the first roller 610a in an axial direction of the first rotation axis (not shown). In addition, the scraping teeth 642a at the second scraper 640a are disposed so as to be inserted into the receiving portion (the concave portion 616a) into which the scraping teeth 632a are not inserted. With a configuration in which the first scraper 630a and the second scraper 630b are disposed in this way, the noodle threads are scraped to be cut out separately by the scraping teeth 632a and 642a at the first scraper 630a and the second scraper 640a in this order, in accordance with the rotation of the first roller 610a. At the second roller as well, the noodle threads are similarly cut out separately by the third scraper and the fourth scraper. A subsequent process is similar to that of the abovementioned round blade type.

It should be noted that the scraping teeth 642a at the second scraper 640a (the fourth scraper), as in a case of the round blade type, may have a configuration in which all of the receiving portions (the concave portions 616a) are inserted with the scraping teeth 642a (a configuration having scraping teeth represented by broken lines in FIG. 17B), such that teeth (cleaning teeth) are provided in order to clean the receiving portion (the concave portion 616a) having already been scraped noodle threads by the first scraper 630a.

Although the apparatus for cutting out noodle according to the present invention can be used most effectively for steamed noodles that tend to stick to each other strongly and for instant noodles made from the steamed and subsequently dried noodles, it can be preferably applied to other types of noodles. For example, raw noodles may stick to each other without sufficient powder. In addition, adjacent noodle threads may often stick to each other when the noodle threads are boiled while being conveyed as continuous noodle threads. For such a case, the apparatus for cutting out noodle according to the present invention is efficiently applicable.

Although the first roller 10a having cutting blades is disposed downstream of the carrier conveyor 500 and the second roller 10b having cutting blades is disposed upstream of the carrier conveyor 500 in the abovementioned first embodiment, the present invention is not limited to this setting. For example, the first roller 10a may be disposed upstream of the carrier conveyor 500 and the second roller 10b may be disposed downstream of the carrier conveyor 500. Although the first roller 10a and the second roller 10b are aligned horizontally in the abovementioned first embodiment, the present invention is not limited to this arrangement. For example, they may be aligned in such a manner in which a plane face H connecting the rotation axes of both rollers forms an angle of 45 degrees or more with respect to the horizontal direction.

Although each of the scrapers is disposed symmetrically with respect to a plane face perpendicular to the rotation axes of both rollers having cutting blades in the abovementioned first embodiment, it may not be necessary that they are disposed symmetrically. For example, the teeth tips of the first scraper 30a and the teeth tips of the third scraper 30b may be disposed so that they form angles differing from each other with respect to the meshing position 10. In addition, the teeth tips of the second scraper 40a and the teeth tips of the fourth scraper 40b may be disposed so that they form angles differing from each other with respect to the meshing position 10.

The invention claimed is:

1. An apparatus for cutting out noodle, comprising:
   a housing;
   a first roller having first cutting blade portions rotatable in a first direction about a first rotation axis, the first cutting blade portions forming a plurality of first pushing portions and a plurality of first receiving portions, each of the first pushing portions and each of the first receiving portions extending in a circumferential direction;
   a second roller having second cutting blade portions disposed so as to mesh with the first roller at a meshing position, the second roller rotatable in a second direction opposite to the first direction about a second rotation axis parallel to the first rotation axis, and the second cutting blade portions forming a plurality of second pushing portions and a plurality of second receiving portions, each of the second pushing portions and each of the second receiving portions extending in a circumferential direction;
   a first scraper including a plurality of first scraping teeth inserted into the plurality of first receiving portions, the first scraper being fixed to the housing at a first fixing position;
   a second scraper including a plurality of second scraping teeth respectively inserted into the remainder of the first receiving portions into which the first scraping teeth are not inserted, a second tooth end of each of the plurality of second scraping teeth being disposed more downstream from the meshing position in the first rotation direction about the first rotation axis than a first tooth end of each of the plurality of first scraping teeth, the second scraper being fixed to the housing at a second fixing position;
   a third scraper including a plurality of third scraping teeth inserted into the plurality of second receiving portions, and being fixed to the housing at a third fixing position; and
   a fourth scraper including a plurality of fourth scraping teeth respectively inserted into the remainder of the second receiving portions into which the plurality of third scraping teeth are not inserted, a fourth tooth end of each of the plurality of fourth scraping teeth being disposed more downstream from the meshing position in the second rotation direction about the second rotation axis than a third tooth end of each of the plurality of third scraping teeth, the fourth scraper being fixed to the housing at a fourth fixing position;
   wherein the first scraper includes a first transfer hole allowing noodle threads, which are scraped to fall from each of the plurality of first receiving portions by the plurality of second scraping teeth of the second scraper, to pass through below the first scraper,
   wherein the third scraper includes a second transfer hole allowing noodle threads, which are scraped to fall from each of the plurality of second receiving portions by the plurality of fourth scraping teeth of the fourth scraper, to pass through below the third scraper,
   wherein, in a case where a position away from the meshing position in a horizontal direction that is orthogonal to the first rotation axis and the second rotation axis is referred to as being outward in the horizontal direction,
   the first fixing position lies more outward in the horizontal direction than a position of second teeth ends of the second scraping teeth, and the third fixing position lies more outward in the horizontal direction than a position of fourth teeth ends of the fourth scraping teeth,
   wherein the second scraper extends to the first roller by extending through the first scraper via the first transfer hole, and wherein the fourth scraper extends to the second roller by extending through the third scraper via the second transfer hole.

2. The apparatus according to claim 1,
wherein the second fixing position lies more outward in the horizontal direction than the first fixing position, and
wherein the fourth fixing position lies more outward in the horizontal direction than the third fixing position.

3. The apparatus according to claim 2,
wherein the second scraper comprises a plurality of second scrapers arranged along the first rotation axis,
wherein the first transfer hole comprises a plurality of first transfer holes provided along the first rotation axis that respectively receive the plurality of second scrapers therethrough, and the first transfer holes are adjacent to each other along the first rotation axis and are discontinuous with respect to one another,
wherein the fourth scraper comprises a plurality of fourth scrapers arranged along the second rotation axis, and
wherein the second transfer hole comprises a plurality of second transfer holes provided along the second rotation axis that respectively receive the plurality of fourth scrapers therethrough, and the second transfer holes are adjacent to each other along the second rotation axis and are discontinuous with respect to one another.

4. The apparatus according to claim 1,
wherein the second scraper comprises a plurality of second scrapers arranged along the first rotation axis,
wherein the first transfer hole comprises a plurality of first transfer holes provided along the first rotation axis that respectively receive the plurality of second scrapers therethrough, and the first transfer holes are adjacent to each other along the first rotation axis and are discontinuous with respect to one another,
wherein the fourth scraper comprises a plurality of fourth scrapers arranged along the second rotation axis, and
wherein the second transfer hole comprises a plurality of second transfer holes provided along the second rotation axis that respectively receive the plurality of fourth scrapers therethrough, and the second transfer holes are adjacent to each other along the second rotation axis and are discontinuous with respect to one another.

5. The apparatus according to claim 1,
wherein the first scraper and the second scraper are in contact with the first roller and the second scraper lies more distant from the meshing position than the first scraper, and
wherein the third scraper and the fourth scraper are in contact with the second roller and the fourth scraper lies more distant from the meshing position than the third scraper.

* * * * *